United States Patent
Nakakita et al.

(10) Patent No.: US 7,024,204 B2
(45) Date of Patent: Apr. 4, 2006

(54) WIRELESS COMMUNICATION SCHEME WITH COMMUNICATION QUALITY GUARANTEE AND COPYRIGHT PROTECTION

(75) Inventors: Hideaki Nakakita, Yokohama (JP); Hiroshi Isozaki, Kawasaki (JP); Keiji Tsunoda, Yokohama (JP); Kiyoshi Toshimitsu, Yokohama (JP); Takeshi Saito, Tokyo (JP); Taku Kato, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 245 days.

(21) Appl. No.: 10/615,768

(22) Filed: Jul. 10, 2003

(65) Prior Publication Data

US 2004/0053622 A1 Mar. 18, 2004

(30) Foreign Application Priority Data

Jul. 10, 2002 (JP) .......................... P2002-201126
Jul. 12, 2002 (JP) .......................... P2002-204676

(51) Int. Cl.
*H04Q 7/20* (2006.01)
*H04N 7/167* (2006.01)
*G06F 15/173* (2006.01)

(52) U.S. Cl. ...................... 455/453; 380/201; 709/226
(58) Field of Classification Search ................ 455/453; 380/201; 709/226
See application file for complete search history.

(56) References Cited

U.S. PATENT DOCUMENTS

2001/0038694 A1 * 11/2001 Senshu ........................ 380/201
2002/0052961 A1 * 5/2002 Yoshimine et al. .......... 709/226

FOREIGN PATENT DOCUMENTS

| JP | 11-55286 | 2/1999 |
| JP | 2001-223716 | 8/2001 |
| JP | 2001-326658 | 11/2001 |

* cited by examiner

*Primary Examiner*—William D. Cimming
(74) *Attorney, Agent, or Firm*—Oblon, Spivak, McClelland, Maier & Neustadt, P.C.

(57) ABSTRACT

A wireless base station which controls joining of a plurality of wireless terminals to a wireless network, stores a maximum joining possible terminal number which indicates a maximum number of the wireless terminals of each terminal type that can join the wireless network simultaneously, and which is set in advance for each one of a plurality of terminal types that classify the wireless terminals, and a currently joining terminal number which indicates a number of the wireless terminals of each terminal type that are currently joining the wireless network, for each one of the plurality of the terminal types. Then, the wireless base station judges whether the joining of one wireless terminal of one terminal type which sent a request message to the wireless network is permitted or not, according to the maximum joining possible terminal number for the one terminal type and the currently joining terminal number stored for the one terminal type.

5 Claims, 31 Drawing Sheets

FIG. 6

| TYPE | MAXIMUM NUMBER OF TERMINALS THAT CAN JOIN | NUMBER OF TERMINALS CURRENTLY JOINING |
|---|---|---|
|  |  |  |
|  |  |  |
|  |  |  |

FIG. 7

| TYPE | MAXIMUM NUMBER OF TERMINALS THAT CAN JOIN | BIT RATE | JITTER | TRANSMISSION DISTANCE | NUMBER OF TERMINALS CURRENTLY JOINING |
|---|---|---|---|---|---|
|  |  |  |  |  |  |
|  |  |  |  |  |  |
|  |  |  |  |  |  |

FIG. 9A

| FRAME TYPE | TERMINAL TYPE | MINIMUM BIT RATE | MAXIMUM TOLERABLE JITTER | MAXIMUM TRANSMISSION DISTANCE |

FIG. 9B

| FRAME TYPE | TERMINAL TYPE | APPLICATION TYPE | MINIMUM BIT RATE | MAXIMUM TOLERABLE JITTER | MAXIMUM TRANSMISSION DISTANCE |

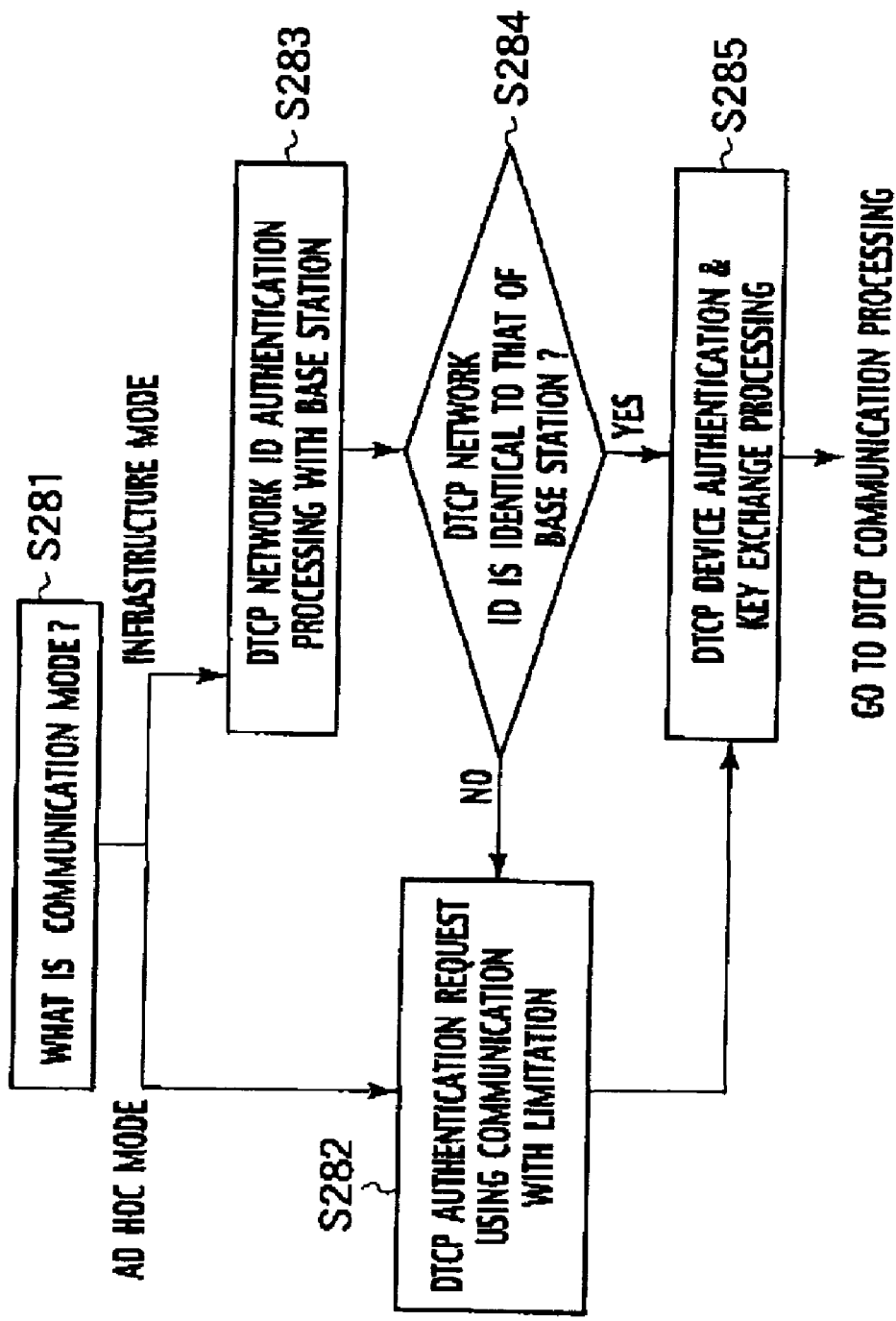

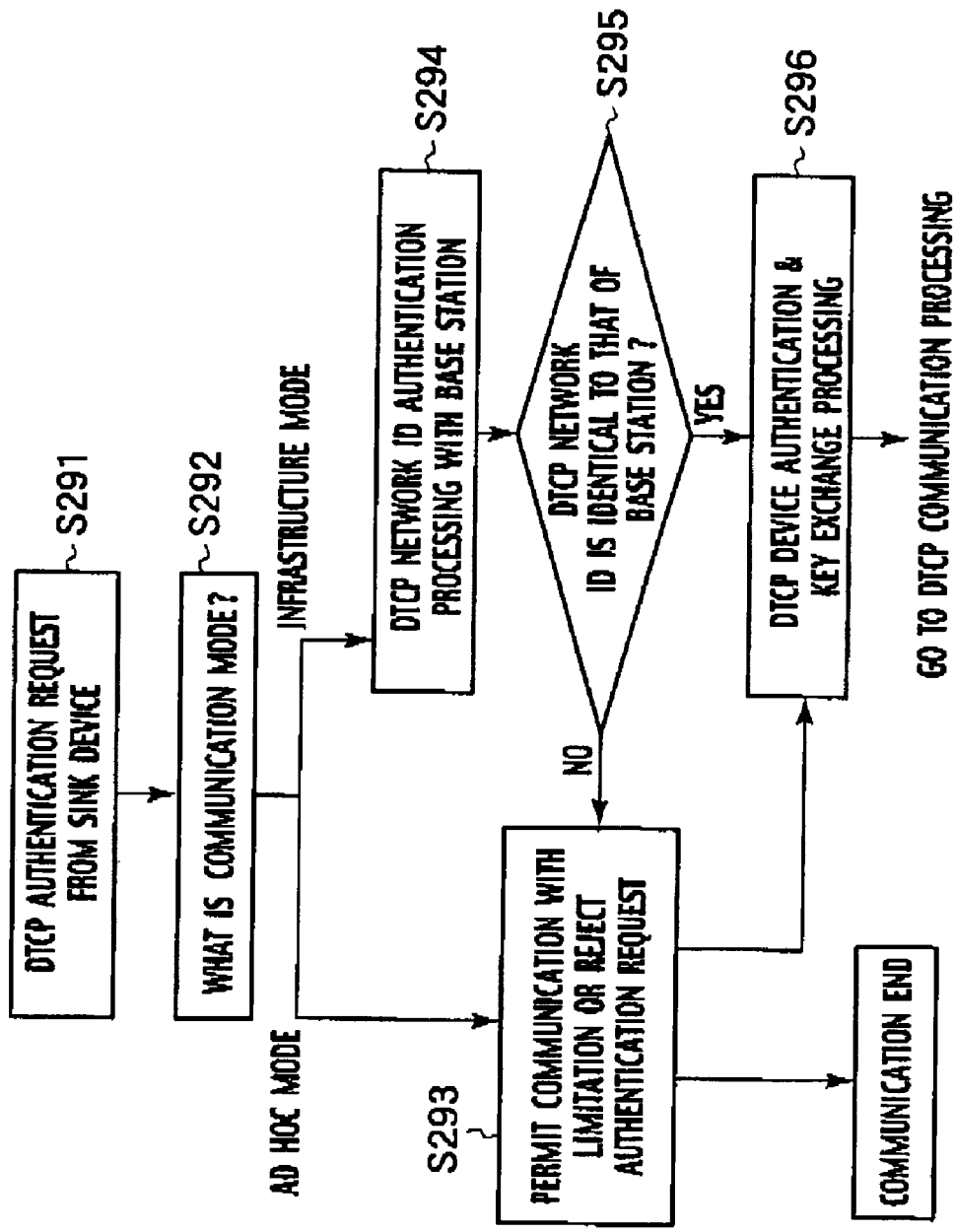

WIRELESS COMMUNICATION SCHEME WITH COMMUNICATION QUALITY GUARANTEE AND COPYRIGHT PROTECTION

BACKGROUND OF THE INVENTION

1. Field of the Invention

The present invention relates to a wireless base station, a network joining control method, a wireless terminal and a communication control method in a wireless network. The present invention also relates to a transmitting device, a receiving device and a wireless base station for transmitting and receiving various types of contents for which the copyright protection is necessary via a network.

2. Description of the Related Art

In recent years, in conjunction with the advance of the LAN (Local Area Network) technique, the networking in the office environment has been developed mainly in forms of wired connections among PCs (Personal Computers).

While such wired LANs are spreading the use of the wireless LAN in which a part of the wired LAN is replaced by radio is also in progress. For example, consider the case where a wireless base station is connected to the wired LAN and a plurality of portable PCs are connected to this base station by radio. In this case, when a file of a desk-top PC connected to the wired LAN by Ethernet™ is edited from the portable PC, the radio access to the wired LAN is realized.

Also, when portions of the base station and the portable PC are extracted, these portions form a wireless LAN. The advantages of such a wireless LAN are that there is no need to lay cables because radio waves or infrared rays are used as transmission paths, and that a new construction or a layout change of the network is easy.

The introduction of such a wireless LAN is becoming popular due to the standardization of IEEE 802.11. Namely, the standardization and the research and development of the wireless LAN have been made mostly in the 2.4 GHz band and the 5 GHz band, because of the radio characteristics such as a transmission distance and a directivity, the communication policy for effectively utilizing the radio bandwidth which is a limited resource, and in view of the manufacturing cost which is preferably suppressed as low as possible from a viewpoint of the makers.

Then, in IEEE 802.11, the 2.4 GHz band wireless LAN specification was completed in 1997, and the 5 GHz band wireless LAN specification was completed in 1999. The wireless network protocols in these frequency bands basically accommodate a plurality of terminals by using the time division multiplexing.

In the 2.4 GHz band wireless LAN specification, the transmission rate is either 1 to 2 Mbps or 11 Mbps, and the specification with the transmission rate over 20 Mbps is currently under the discussion. Recently, products compatible with this 2.4 GHz band specification have been released by many companies so that the base station and the wireless PC card are now priced in an affordable range of general users.

Note that, in this 2.4 GHz band, there is a trend to install the Bluetooth™ on all kinds of devices in a variety of fields including those of portable telephones, home electronics and PCs. This Bluetooth™ is also a wireless system, and it is expected to spread worldwide due to its low cost of about $5 for one chip, its wide acceptance by approximately 2000 companies in a variety of fields, and its standardization activity that has been made in direct connection with the product developments.

On the other hand, the 5 GHz band wireless LAN specification can realize the transmission rate of 20 to 30 Mbps. Also, unlike the 2.4 GHz band, 5 GHz band is currently almost unused frequency band in which faster transmission rates can be expected easily, so that it has a high prospect of becoming the next generation wireless LAN specification, or the specification for communicating video contents such as those of TV programs and movies. It is already sold at a price of one chip at $35 in 2001, and the LSI development race is expected to become more heated up in the future.

Note that, in addition to the specification made by the IEEE in the U.S.A., there is a specification called Hiper-LAN2 which is made in Europe, and a specification called wireless 1394 which is made in Japan. In these three specifications, what is called physical layer (PHY layer) in the communication protocol is nearly common, but a way of defining MAC layer is different. As such, 5 GHz band is now becoming familiar.

From the circumstances described above, as wireless devices are spread, the range of application of these techniques is expected to cover not just the office environment but also the general homes as well. In particular, the fact that there is no need to lay cables in the home is possibly even greater attraction than the case of the office environment. Also, from a viewpoint that it is possible to carry out communications of the AV (Audio Visual) data, it is rather expected that their needs are higher at the homes.

In the frequency bands such as 2.4 GHz band and 5 GHz band that are intended to be used for the wireless communications, there is a possibility of being influenced by the spatial shape or other devices. In particular, in the case of the contents for which the real time characteristic is required, there is a possibility of having disturbances in the video or speech due to the occurrence of errors or the difficulty of the reproduction at constant time interval.

The 2.4 GHz band is used by the existing devices such as the microwave ovens and the portable telephones used in the U.S.A. The IEEE 802.11b wireless LAN and the ad hoc network formed by the Bluetooth devices use this frequency band, so that they have a possibility of being influenced by these existing devices. They also have a possibility of interfering with each other at a location where these two types of network coexist.

In the 5 GHz band, the standard specifications such as IEEE 802.11a wireless LAN, HiperLAN2, and ARIB wireless 1394™ are established and one of their major objectives is the faster accommodation of applications than the 2.4 GHz band. In Japan, it is limited to the indoor use, but 100 MHz band ranging from 5.15 GHz to 5.25 GHz are released to the public and four channels of 20 MHz bandwidth each can be used there. In Europe and U.S.A., other available frequency bandwidths exist.

Compared with the wired communications, the wireless communications are easier to cause bit errors at the communication path in a middle, which can degrade the video and speech if nothing is done. For this reason, the wireless communications employ the FEC (Forward Error Correction) technique in which signals are transmitted after attaching information for enabling the correction of errors at a receiving side such as the Reed-Solomon coding, or a re-transmission technique in which a receiving side is required to return an acknowledgement and signals are repeatedly re-transmitted when this acknowledgement is not received.

In the wireless communications, it is possible to determine the bit rate by a combination of the modulation scheme and the coding rate. The super fine AV data such as those of HDTV require a high bit rate. In addition, the isochronicity is required in order to communicate and reproduce the AV data in real time. For this reason, there is a need for a mechanism by which the bandwidth can be secured at interval which is as constant as possible.

Conventionally, there is a concept of the resource reservation for reserving as much of the bandwidth of the network as required by the individual application. One example of the method for reserving the bandwidth is disclosed in Japanese patent application laid open No. 2001-223716.

However, in the method in which the bandwidths declared for the purpose of the resource reservation by the individual connections are simply summed and the remaining resource is detected according to the sum, there are cases where it is difficult to stably provide the communication quality including the guarantee of the isochronicity mentioned above, because of the overhead occurring in relation to the total number of connections and the influence due to the variation of the transmission bit rate of the individual connection. It is particularly likely to encounter such cases when the resources are used near an upper limit of the bandwidth resources allowed by the network.

As described, it has been difficult to guarantee the communication quality required by each wireless terminal when a plurality of wireless terminals exist.

Also, in recent years, as the price of the wireless device in compliance with the specification of IEEE 802.11 or the like is lowering, it becomes possible to construct the wireless communication system easily and inexpensively, Also, there is a trend for the communication speed of the wireless communication system to become faster, so that a difference from a wired communication using communication cables is becomes insignificant in terms of the speed.

Recently, it is becoming possible to handle large capacity data such as AV contents easily by a computer for home use, so that it is convenient for the users if it is possible to transmit and receive data such as AV contents by using the wireless communication system.

However, if the reproduced signals of the AV contents reproduction device such as DVD player are transmitted by radio, it would be possible for all the AV contents receiving device within a prescribed range to receive them. For this reason, it is possible to consider the use of a mechanism in which only the AV contents receiving device which succeeded the authentication can receive the AV contents, so as to protect the copyright. However, there is a problem in that if the authentication at the copyright protection layer succeeds at the AV contents receiving device once, it is impossible to distinguish whether this AV contents receiving device is a formally permitted device or not.

In order to avoid such a problem, there is a proposition of the wireless communication system which realizes the secure copyright protection by preventing wireless devices other than those which are formally permitted to make accesses without a permission, in the wireless environment, as disclosed in commonly assigned co-pending U.S. patent application Ser. No. 09/934/674.

However, even when the user A sets up the access control for the device by setting an ID indicating that the user A is an owner of the device, if this ID becomes known to a user B who owns another device, the user B would be able to make access to the wireless device of the user A. For this reason, if the malicious contents owner constructs the wireless communication system and discloses the ID of the device to the public, it becomes possible to distribute the contents with the copyright protection, without a permission of the author. Consequently, this is not a fundamental solution for preventing the illegal distribution of contents, from a viewpoint of the copyright protection.

BRIEF SUMMARY OF THE INVENTION

It is therefore an object of the present invention to provide a wireless base station, a network joining control method, a wireless terminal, and a communication control method capable of guaranteeing the communication quality required by each wireless terminal of each terminal type.

It is another object of the present invention to provide a transmitting device, a receiving device, and a wireless base station capable of tightening the copyright protection, without adversely affecting the convenience of the user.

According to one aspect of the present invention there is provided a wireless base station which controls joining of a plurality of wireless terminals to a wireless network, the wireless base station comprising: a first memory unit configured to store a maximum joining possible terminal number which indicates a maximum number of the wireless terminals of each terminal type that can join the wireless network simultaneously, and which is set in advance for each one of a plurality of terminal types that classify the wireless terminals; a second memory unit configured to store a currently joining terminal number which indicates a number of the wireless terminals of each terminal type that are currently joining the wireless network, for each one of the plurality of the terminal types; a reception unit configured to receive a request message for requesting joining to the wireless network from one wireless terminal of one terminal type; a judgement unit configured to judge whether the joining of the one wireless terminal which sent the request message to the wireless network is permitted or not, according to the maximum joining possible terminal number stored in the first memory unit for the one terminal type and the currently joining terminal number stored in the second memory unit for the one terminal type, when the request message is received; and a transmission unit configured to transmit a response message indicating a judgement result obtained by the judgement unit, to the one wireless terminal.

According to another aspect of the present invention there is provided a network joining control method at a wireless base station which controls joining of a plurality of wireless terminals to a wireless network, the network joining control method comprising: storing a maximum joining possible terminal number which indicates a maximum number of the wireless terminals of each terminal type that can join the wireless network simultaneously, and which is set in advance for each one of a plurality of terminal types that classify the wireless terminals, into a first memory unit; storing a currently joining terminal number which indicates a number of the wireless terminals of each terminal type that are currently joining the wireless network, for each one of the plurality of the terminal types, into a second memory unit; receiving a request message for requesting joining to the wireless network from one wireless terminal of one terminal type; judging whether the joining of the one wireless terminal which sent the request message to the wireless network is permitted or not, according to the maximum joining possible terminal number stored in the first memory unit for the one terminal type and the currently joining terminal number stored in the second memory unit for the one terminal type, when the request message is received; and transmitting a response message indicating a judgement result obtained by the judgement step, to the one wireless terminal.

According to another aspect of the present invention there is provided a computer program product for causing a computer to function as a wireless base station which controls joining of a plurality of wireless terminals to a wireless network, the computer program product comprising: a first computer program code for causing the computer to store a maximum joining possible terminal number which indicates a maximum number of the wireless terminals of each terminal type that can join the wireless network simultaneously, and which is set in advance for each one of a plurality of terminal types that classify the wireless terminals, into a first memory unit; a second computer program code for causing the computer to store a currently joining terminal number which indicates a number of the wireless terminals of each terminal type that are currently joining the wireless network, for each one of the plurality of the terminal types, into a second memory unit; a third computer program code for causing the computer to receive a request message for requesting joining to the wireless network from one wireless terminal of one terminal type: a fourth computer program code for causing the computer to judge whether the joining or the one wireless terminal which sent the request message to the wireless network is permitted or not, according to the maximum joining possible terminal number stored in the first memory unit for the one terminal type and the currently joining terminal number stored in the second memory unit for the one terminal type, when the request message is received; and a fifth computer program code for causing the computer to transmit a response message indicating a judgement result obtained by the judgement unit, to the one wireless terminal.

According to another aspect of the present invention there is provided a wireless terminal that requests a wireless base station to permit joining of the wireless terminal to a wireless network, the wireless terminal comprising: a transmission unit configured to transmit a request message to the wireless base station which manages the wireless network, the request message containing an indication that the joining to the wireless network is requested, an information indicating a terminal type of the wireless terminal, and all or a part of values of prescribed parameters including a minimum bit rate which indicates a minimum bandwidth requested by the wireless terminal, a maximum tolerable jitter with respect to a periodic transmission interval requested by the wireless terminal, and a maximum transmission distance requested by the wireless terminal; and a reception unit configured to receive a response message indicating a permission of the joining, which is transmitted by the wireless base station in response to the request message, when it is judged that the joining is permitted as a first joining condition based on an upper limit number of terminals that can join the wireless network simultaneously which is set in advance for the terminal type contained in the request message is satisfied, and a second joining condition based on the values of the prescribed parameters contained in the request message is satisfied.

According to another aspect of the present invention there is provided a communication control method at a wireless terminal that requests a wireless base station to permit joining of the wireless terminal to a wireless network, the communication control method comprising: transmitting a request message to the wireless base station which manages the wireless network, the request message containing an indication that the joining to the wireless network is requested, an information indicating a terminal type of the wireless terminal, and all or a part of values of prescribed parameters including a minimum bit rate which indicates a minimum bandwidth requested by the wireless terminal, a maximum tolerable jitter with respect to a periodic transmission interval requested by the wireless terminal, and a maximum transmission distance requested by the wireless terminal; and receiving a response message indicating a permission of the joining, which is transmitted by the wireless base station in response to the request message, when it is judged that the joining is permitted as a first joining condition based on an upper limit number of terminals that can join the wireless network simultaneously which is set in advance for the terminal type contained in the request message is satisfied, and a second joining condition based on the values of the prescribed parameters contained in the request message is satisfied.

According to another aspect of the present invention there is provided a computer program product for causing a computer to function as a wireless terminal that requests a wireless base station to permit joining of the wireless terminal to a wireless network, the computer program product comprising: a first computer program code for causing the computer to transmit a request message to the wireless base station which manages the wireless network, the request message containing an indication that the joining to the wireless network is requested, an information indicating a terminal type of the wireless terminal, and all or a part of values of prescribed parameters including a minimum bit rate which indicates a minimum bandwidth requested by the wireless terminal, a maximum tolerable jitter with respect to a periodic transmission interval requested by the wireless terminal, and a maximum transmission distance requested by the wireless terminal; and a second computer program code for causing the computer to receive a response message indicating a permission of the joining, which is transmitted by the wireless base station in response to the request message, when it is judged that the joining is permitted as a first joining condition based on an upper limit number of terminals that can join the wireless network simultaneously which is set in advance for the terminal type contained in the request message is satisfied, and a second joining condition based on the values of the prescribed parameters contained in the request message is satisfied.

According to another aspect of the present invention there is provided a transmitting device for transmitting contents for which a copyright protection is necessary, to one or more receiving devices through a network, the transmitting device comprising: a contents supply unit configured to store or generate the contents; a communication processing unit configured to select a communication mode in case of carrying out communications with receiving devices; a device authentication and key exchange processing unit configured to determine a receiving device number indicating a number of receiving devices with which communications can be carried out, according to the communication mode selected by the communication processing unit, and carry out device authentication and key exchange with receiving devices in number which is less than or equal to the receiving device number; an encryption processing unit configured to encrypt the contents by using a key exchanged by the device authentication and key exchange processing unit; and a network interface unit configured to transmit the contents encrypted by the encryption processing unit, to the receiving devices in number which is less than or equal to the receiving device number.

According to another aspect of the present invention there is provided a transmitting device for transmitting contents for which a copyright protection is necessary, to one or more receiving devices through a wireless base station via a network, the transmitting device comprising: a contents supply unit configured to store or generate the contents; an ID recording unit configured to record in advance a network ID of the wireless base station which is to be used in an authentication processing with the wireless base station; a network ID authentication processing unit configured to carry out authentication of the network ID with the wireless base station by using the network ID recorded in the ID recording unit; a device authentication and key exchange processing unit configured to switch a receiving device number indicating a number of receiving devices with which communications can be carried out, according to an authentication result obtained by the network ID authentication processing unit, and carry out device authentication and key exchange with receiving devices in number which is less than or equal to the receiving device number; an encryption processing unit configured to encrypt the contents by using a key exchanged by the device authentication and key exchange processing unit; and a network interface unit configured to transmit the contents encrypted by the encryption processing unit, to the receiving devices in number which is less than or equal to the receiving device number.

According to another aspect of the present invention there is provided a transmitting device for transmitting contents for which a copyright protection is necessary, to one or more receiving devices through a network, the transmitting device comprising: a contents supply unit configured to store or generate the contents; a communication processing unit configured to select a communication mode in case of carrying out communications with receiving devices; a device authentication and key exchange processing unit configured to determine a key to be used as either a key that permits a finite number of copies or a key that prohibits copies, according to the communication mode selected by the communication processing unit, and carry out device authentication and key exchange for the copyright protection with receiving devices; an encryption processing unit configured to encrypt the contents by using a key exchanged by the device authentication and key exchange processing unit; and a network interface unit configured to transmit the contents encrypted by the encryption processing unit, to the receiving devices.

According to another aspect of the present invention there is provided a transmitting device for transmitting contents for which a copyright protection is necessary, to one or more receiving devices through a wireless base station via a network, the transmitting device comprising: a contents supply unit configured to store or generate the contents; an ID recording unit configured to record in advance a network ID of the wireless base station which is to be used in an authentication processing with the wireless base station; a network ID authentication processing unit configured to carry out authentication of the network ID with the wireless base station by using the network ID recorded in the ID recording unit; a device authentication and key exchange processing unit configured to determine a key to be used as either a key that permits a finite number of copies or a key that prohibits copies, according to an authentication result obtained by the network ID authentication processing unit, and carry out device authentication and key exchange for the copyright protection with receiving devices; an encryption processing unit configured to encrypt the contents by using a key exchanged by the device authentication and key exchange processing unit; and a network interface unit configured to transmit the contents encrypted by the encryption processing unit, to the receiving devices in number which is less than or equal to the receiving device number.

According to another aspect of the present invention there is provided a receiving device for receiving contents for which a copyright protection is necessary, from a transmitting device via a network, the receiving device comprising: a communication processing unit configured to select a communication mode in case of carrying out communications with the transmitting device; a device authentication and key exchange processing unit configured to exchange a key that permits a finite number of copies or a key that prohibits copies with the transmitting device, according to the communication mode selected by the communication processing unit, and carry out device authentication and key exchange for the copyright protection with the transmitting device: a network interface unit configured to receive the contents which are encrypted, from the transmitting device; and a decryption processing unit configured to decrypt the contents received by the network interface unit, by using a key exchanged by the device authentication and key exchange processing unit.

According to another aspect or the present invention there is provided a receiving device for receiving contents for which a copyright protection is necessary, from a transmitting device through a wireless base station via a network, the receiving device comprising: an ID recording unit configured to record in advance a network ID of the wireless base station which is to be used in an authentication processing with the wireless base station; a network ID authentication processing unit configured to carry out authentication of the network ID with the wireless base station by using the network ID recorded in the ID recording unit; a device authentication and key exchange processing unit configured to exchange a key that permits a finite number of copies or a key that prohibits copies with the transmitting device, according to an authentication result obtained by the network ID authentication processing unit, and carry out device authentication and key exchange for the copyright protection with the transmitting device; a network interface unit configured to receive the contents which are encrypted, from the transmitting device; and a decryption processing unit configured to decrypt the contents received by the network interface unit, by using a key exchanged by the device authentication and key exchange processing unit.

According to another aspect of the present invention there is provided a wireless base station for receiving contents for which a copyright protection is necessary, from a transmitting device via a network, and transmitting received contents to one or more receiving devices, the wireless base station comprising: a first network ID authentication processing unit configured to carry out an authentication of a network ID with the transmitting device; a second network ID authentication processing unit configured to carry out an authentication of a network ID with the receiving devices; and a revocation information registration unit configured to register at least one of an identification information of each transmitting device which should be prohibited to transmit the contents and an identification information of each receiving device which should be prohibited to receive the contents; wherein the transmitting device and the receiving devices switch a number of transmitting devices or receiving devices to carry out device authentication and key exchange or an encryption scheme, according to authentication results obtained by the first network ID authentication processing unit and the second network ID authentication processing unit.

Other features and advantages of the present invention will become apparent from the following description taken in conjunction with the accompanying drawings.

BRIEF DESCRIPTION OF THE DRAWINGS

FIG. 6 is a diagram showing one exemplary management table that can be used by a base station according to the first embodiment of the present invention.

FIG. 7 is a diagram showing another exemplary management table that can be used by a base station according to the first embodiment of the present invention.

FIGS. 9A and 9B are diagrams showing exemplary configurations of a network joining request frame according to the first embodiment of the present invention.

FIG. 32 is a flow chart showing a processing procedure of a sink device according to the third embodiment of the present invention.

FIG. 33 is a flow chart showing a processing procedure of a source device according to the third embodiment of the present invention.

DETAILED DESCRIPTION OF THE INVENTION

Referring now to FIG. 1 to FIG. 15, the first embodiment of the present invention will be described in detail.

Figure 1:
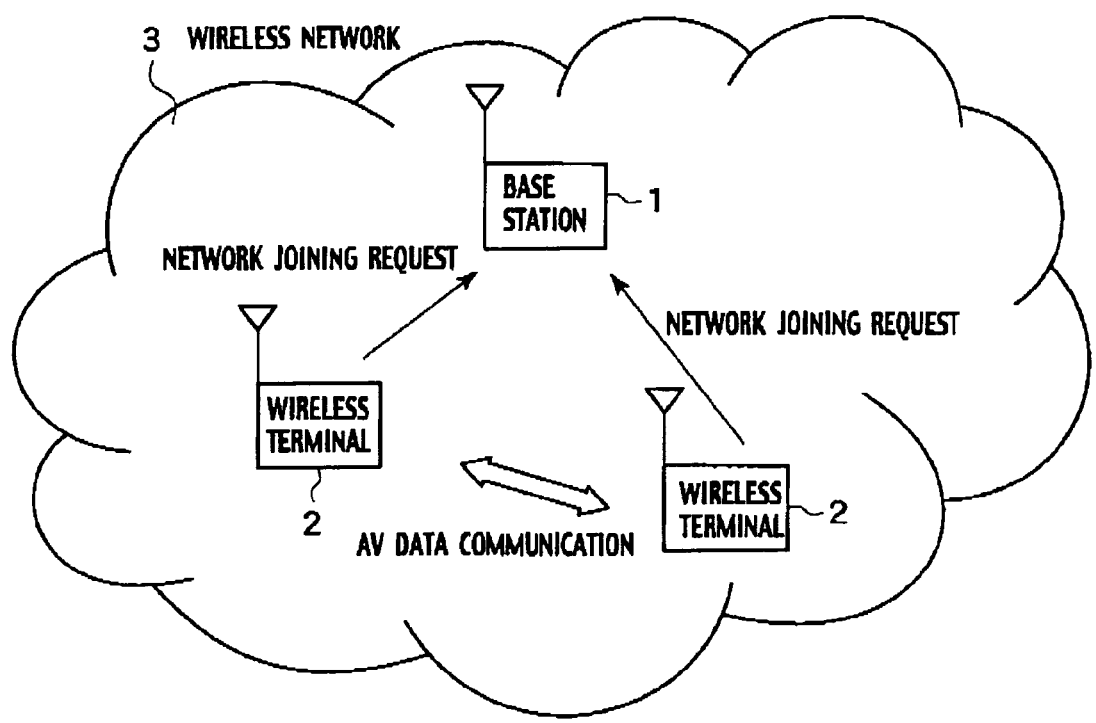
FIG. 1 is a schematic diagram showing an exemplary configuration of a wireless network system according to the first embodiment of the present invention.

FIG. 1 shows an exemplary configuration of a wireless network system according to the first embodiment, which comprises a wireless base station (which will be referred hereafter as base station) for managing a wireless network 3, and wireless terminals 2 which join the wireless network 3 after making a joining request to the base station 1 and receiving a permission. In the wireless network of FIG. 1, it is assumed that many wireless terminals can exist besides two wireless terminals shown in the figure.

Note that the wireless network is not limited to any specific type. For example, it can be a network according to any one of Bluetooth™, IEEE 802.11, HiperLAN2, ARIB wireless 1394™, etc.

Figure 2:
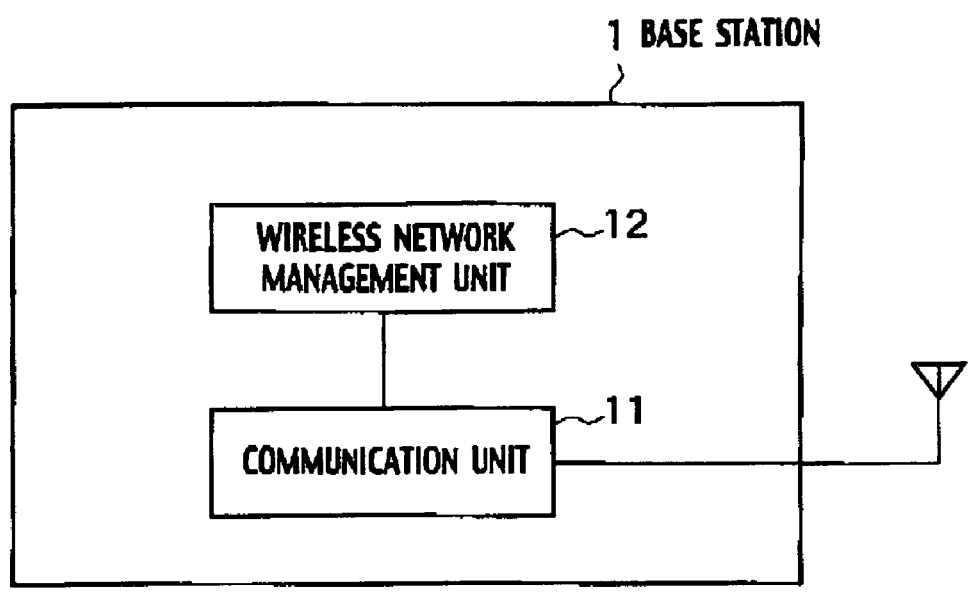
FIG. 2 is a block diagram showing an exemplary configuration of a base station according to the first embodiment of the present invention.

FIG. 2 shows an exemplary configuration of the base station 1 in this embodiment. As shown in FIG. 2, the base station 1 has a communication unit 11 for carrying out communications with the wireless terminals 2, and a wireless network management unit 12 for carrying out the management of the wireless network such as giving a permission or a refusal according to prescribed judgement criteria when a network joining request (network joining request message) is received from the wireless terminal 2.

Figure 3:
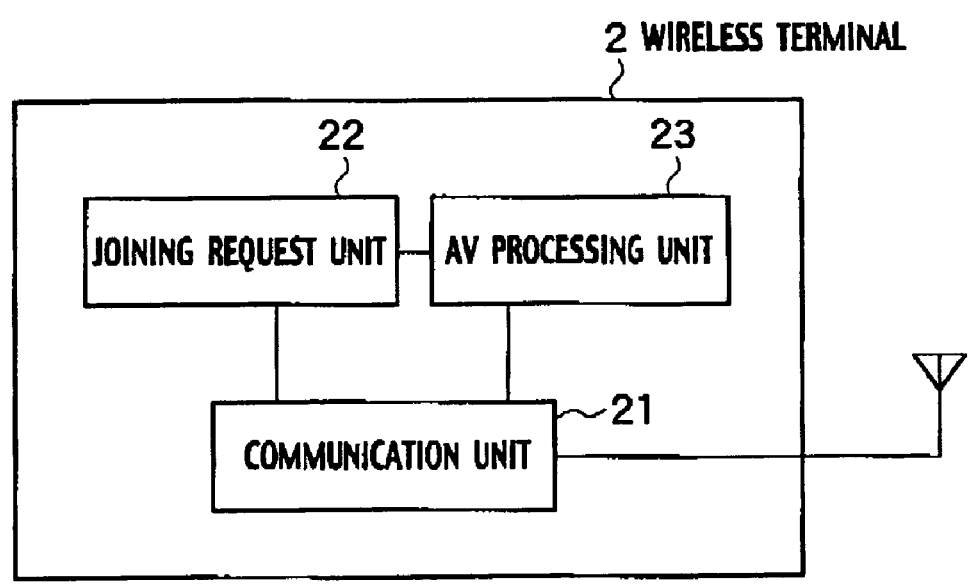
FIG. 3 is a block diagram showing an exemplary configuration of a wireless terminal according to the first embodiment or the present invention.

FIG. 3 shows an exemplary configuration of the wireless terminal 2 in this embodiment. As shown in FIG. 3, the wireless terminal 2 has a communication unit 21 for carrying out communications with the base station 1 or the wireless terminal 2, a joining request unit 22 for making the network joining request to the base station 1 whenever necessary such as at a time of the AV data transfer, and an AV processing unit 23 for carrying out the processing for transmitting or receiving the AV data.

The exemplary configuration of FIG. 3 is an example in which the wireless terminal 2 has a function of operating as a transmitting side and/or a receiving side of the AV data. It is also possible to provide processing units for the other prescribed functions, in addition to the AV processing unit 23 or instead of the AV processing unit 23.

Note that, in the following, when the wireless terminal 2 has a function of operating as a transmitting side and/or a receiving side of the AV data as an example, such a wireless terminal will also be referred to as an AV data terminal.

Figure 4:
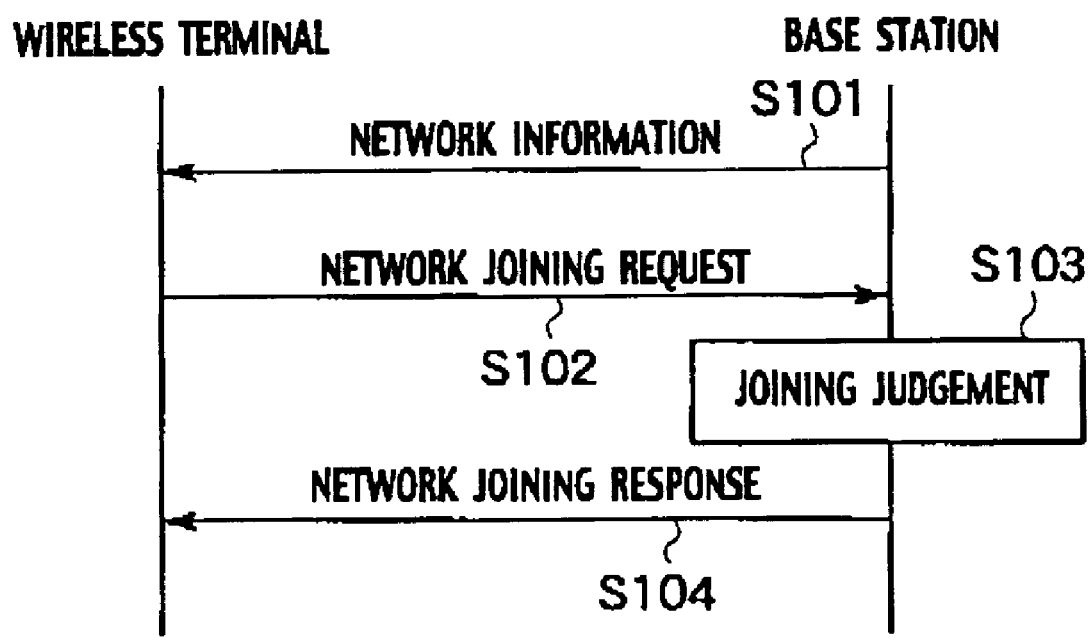
FIG. 4 is a sequence chart showing an exemplary operation sequence at a time of a network joining request according to the first embodiment of the present invention.

FIG. 4 shows an exemplary processing sequence at a time of the joining request in this embodiment.

Usually, in the wireless network protocol., the information regarding the wireless network which is a management target is broadcasted from the base station 1 (step S101). According to this information, the wireless terminal 2 can discover the wireless network and make the joining request. Note that the step S101 is not indispensable, and it is also possible to use information other than the information broadcasted from the base station 1.

When it is desired or necessary to join the above described network, the wireless terminal 2 transmits the network joining request to the base station 1 (step S102). Note that the values of prescribed parameters may be described in the network joining request.

When the network joining request from the wireless terminal 2 in the network is received, the base station 1 carries out the joining judgement as to whether the joining is to be permitted or rejected according to the prescribed judgement criteria, for this network joining request (step S103). Note that, in the case where the wireless terminal 2 describes values of the prescribed parameters in the network joining request, the base station 1 may carry out the joining judgement according to these values of the prescribed parameters.

Then, when the permission or the rejection is determined, the base station 1 returns a network joining response (network joining response message) corresponding to the permission or the rejection to the request source wireless terminal 2 (step S104). Note that, in the case of the rejection, the reason for the rejection may be described in the network joining response.

When the network joining response is received, the wireless terminal 2 learns the permission or the rejection (and the reason for it or the limitation imposed on it) by referring to this content of the network joining response. Then, the wireless terminal 2 can make the next action according to whether it is the permission or the rejection. For example, if it is the permission, the desired data transfer through that network is attempted. Also, for example, if it is the rejection, the network joining request is made again after waiting for awhile, or the network joining request is made again by changing the values of the parameters in the case of describing the values of the prescribed parameters in the network joining request, or the fact that the network joining request is rejected is presented to the user.

Note that there are many possible s for the method by which the wireless terminal 2 that has been permitted the network joining to leave that network. For example, in the case where the wireless terminal 2 leaves the network after the network joining is permitted by the base station 1, it is possible to carry out a network leaving notification to the base station 1. It is also possible for the base station 1 to regard the wireless terminal 2 that has been joining the network as having left the network when no communication is carried out by the wireless terminal for a prescribed period of time. It is also possible for the base station 1 to force a part or all of the wireless terminals that have been joining the network to leave the network when a prescribed condition holds, by issuing a network leaving command to the wireless terminal 2 that should leave the network. It is also possible to use more than one of these methods in combination.

In the following, the wireless network management according to this embodiment will be described, with a main focus on the network joining.

In this embodiment, the types of terminals are classified in advance, and the permission or the rejection for the network joining request is determined for each terminal type differently.

Figure 5:
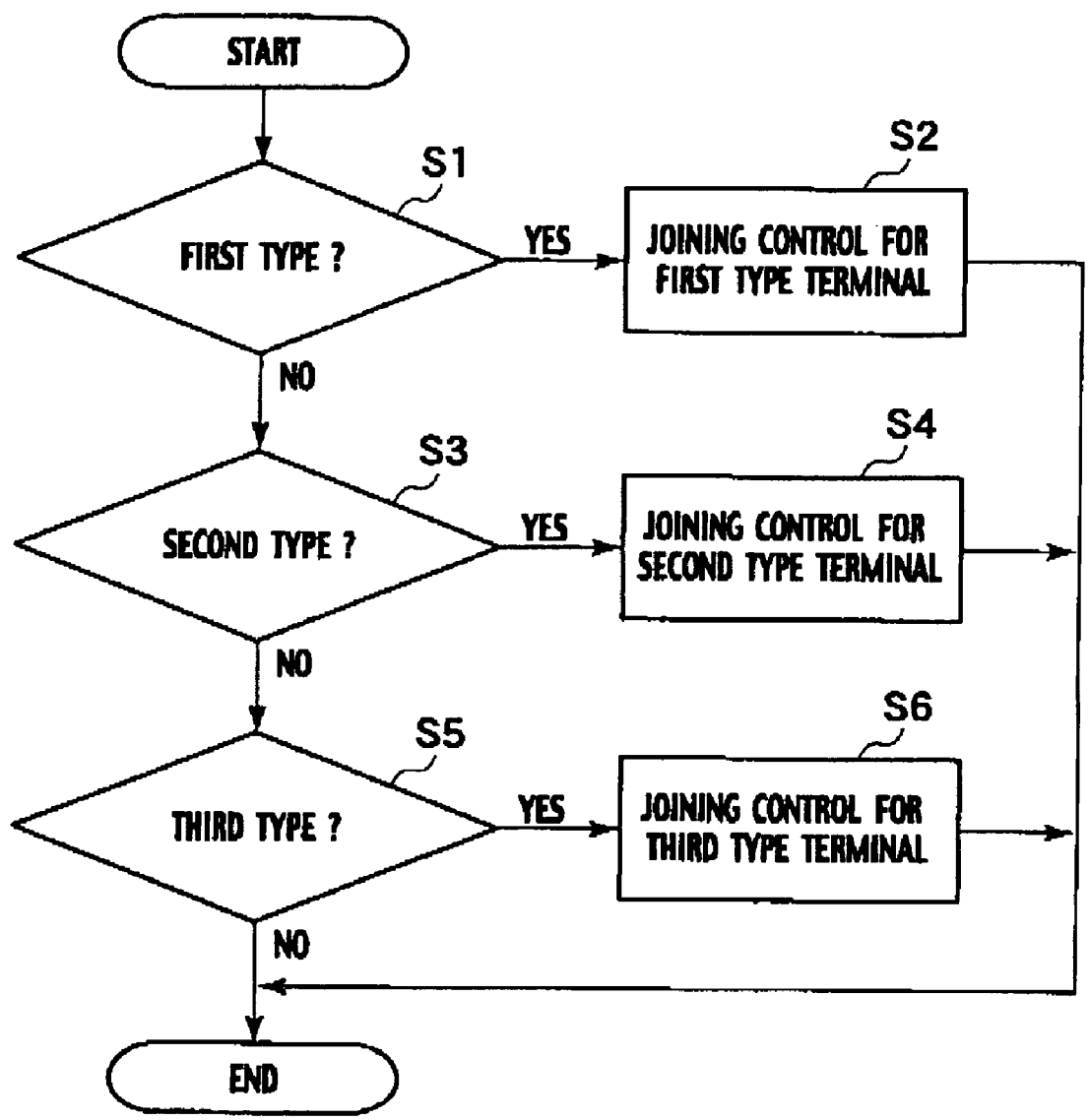
FIG. 5 is a flow chart showing an exemplary processing procedure of the case at a time of receiving a network joining request according to the first embodiment of the present invention.

FIG. 5 shows an exemplary processing procedure for judging the permission or the rejection when the base station 1 receives the network joining request from the wireless terminal 2.

As shown in FIG. 5, the base station 1 refers to the terminal type in relation to the network joining request from one wireless terminal 2, and if it is the first type (step S1), the joining control for the first type terminal is carried out (step S2), if it is the second type (step S3), the joining control for the second type terminal is carried out (step S4), and if it is the third type (step S5), the joining control for the third type terminal is carried out (step S6).

When it is determined to permit the network joining, the base station 1 returns a response indicating the permission to the requesting source wireless terminal 2. On the other hand, when it is determined to reject, the base station 1 returns a response indicating the rejection.

There are many possible variations for the way of determining the type. For example, it is possible to classify a terminal for transmitting and receiving video data as the first type, a terminal for transmitting and receiving still image data which does not transmit or receive video data as the second type, and a terminal which does not transmit or receive video data and still image data as the third type. It is also possible to classify a terminal for transmitting and receiving AV data at high speed as the first type, a terminal for transmitting and receiving AV data at low speed as the second type, and any other terminal as the third type, it is also possible to classify terminals according to the bit rate required by the wireless terminal. It is also possible to use the application type as the terminal type.

It is also possible to set the type by a combination of classification according to the first method and classification according to the second method, it is also possible to use three or more classification methods similarly.

The content of the joining control for the first type terminal, the content of the joining control for the second type terminal, and the content of the joining control for the third type terminal may be identical or different.

Note that the case shown in FIG. 5 is an exemplary case of setting three terminal types, but it is also possible to set two terminal types, or four or more terminal types, similarly.

In one exemplary content of the joining control, the upper limit n for the number of terminals that can join the network simultaneously (which will be referred to as a maximum number of terminals that can join) is determined in advance for each type of terminal, and after the number of terminals currently joining reaches to this maximum number n of terminals that can join for one type, the new joining is not permitted for that type. Note that, when there is an upper limit number N that is uniquely determined for the wireless network for some reason, it is preferable to set the maximum number n of terminals that can join to be a value smaller than the unique upper limit number N. FIG. 6 shows an exemplary management table for managing the number of terminals that are currently joining simultaneously for each one of three terminal types.

In this case, the base station 1 determines to permit the network joining if a number obtained by adding one to the number of terminals currently joining for that type of terminal does not exceed the maximum number n of terminals that can join (or the number of terminals currently joining for that type of terminal is less than the maximum number n of terminal that can join) on an assumption of giving a permission to the terminal that made the network joining request. The base station 1 determines to reject the network joining if a number obtained by adding one to the number of terminals currently joining for that type of terminal exceeds the maximum number n of terminals that can join (or the number of terminals currently joining for that type of terminal is equal to the maximum number n of terminal that can join) on an assumption of giving a permission to the terminal that made the network joining request.

In another exemplary content of the joining control, the maximum number n of terminals that can join the network simultaneously is determined in advance for each type of terminal similarly as in the above example, and when this condition is satisfied, whether another condition is satisfied or not is judged and the network joining is permitted only when the another condition is also satisfied.

One example of the another condition is that values of parameters such as the minimum bit rate, the maximum tolerable jitter, and the maximum transmission distance are all satisfying reference values determined for each parameter in advance. Here, the minimum bit rate is a minimum bandwidth required by the AV data terminal. There is a need to carry out the AV data communications at periodic timings, and the maximum tolerable jitter is the maximum tolerable value for the jitter of these timings. The maximum transmission distance is the maximum value of the transmission distance desired by the AV data terminal. FIG. 7 shows an exemplary management table for managing the reference values of the parameters and the number of terminals that are currently joining simultaneously for each one of three terminal types.

In the examples of FIG. 6 and FIG. 7, the number of terminals that are currently joining is also managed in the management table, but it is also possible to manage the correspondence between the terminal type and the number of terminals that are currently joining separately from the management table of FIG. 6 or FIG. 7.

Note that it is assumed to be possible to judge each of the parameters described above. For example, the value of each parameter requested by the wireless terminal 2 may be described in the network joining request.

It is also assumed to be possible to judge the terminal type. For example, the information indicating the terminal type may be described in the network joining request.

Figure 8:
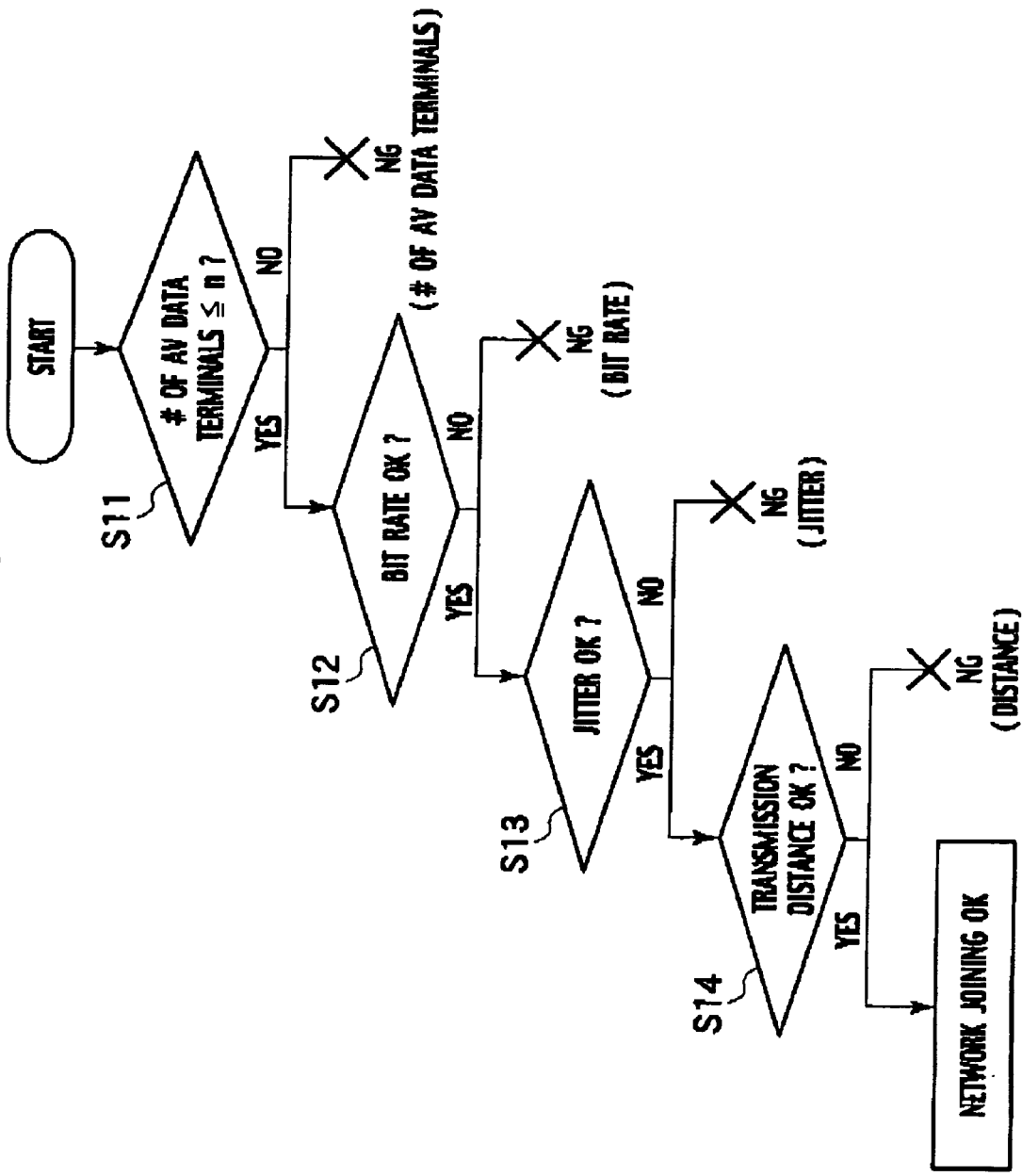
FIG. 8 is a flow chart showing an exemplary processing procedure for a network joining judgement according to the first embodiment of the present invention.
Figure 10:
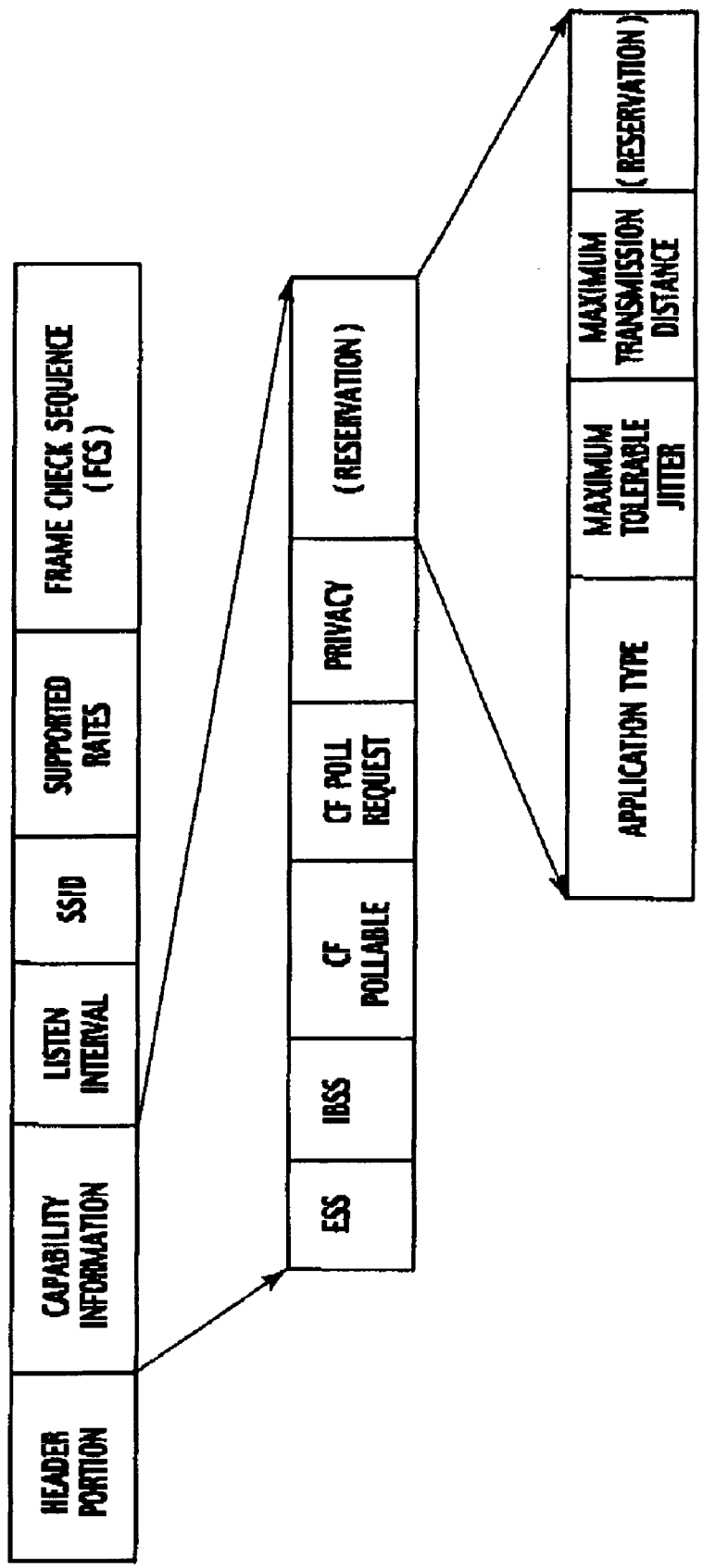
FIG. 10 is a diagram showing an exemplary configuration of a network joining request frame in case of using IEEE 802.11 according to the first embodiment of the present invention.

FIG. 8 shows an exemplary detailed procedure at a time of judging whether the wireless network joining requested from a terminal of one type should be permitted or rejected by the base station 1.

The base station 1 manages the number of terminals that are currently joining for a terminal type of the AV data terminal.

When the network joining request from the AV data terminal 2 is received and it is judged that a terminal type related to the network joining request is the AV data terminal (the first type of FIG. 5, for example) (step S1 of FIG. 5, for example), the base station 1 checks whether the number of terminals currently joining has been reaching to the maximum number n of terminals that can join or not. Then, if the number of terminals currently joining has been reaching to the maximum number n of terminals that can join (step S11 NO), the network joining request is rejected.

On the other hand, if the number of terminals currently joining has not been reaching to the maximum number of terminals that can join ((step S11 YES), the processing proceeds to the check of whether the another condition is cleared or not, by referring to the reference value of each parameter for the corresponding terminal type in the management table of FIG. 7.

Then, for this network joining request, when the minimum bit rate cannot be realized (step S12 NO), or the maximum tolerable jitter for the periodic communication timing cannot be satisfied (step S13 NO), or the maximum transmission distance cannot be achieved (step S14 NO), this network joining request is rejected.

On the other hand, for this network joining request, when the minimum bit rate can be realized (step S12 YES), the maximum tolerable jitter for the periodic transmission timing can be satisfied (step S13 YES), and the maximum transmission distance can be achieved (step S14 YES), this network joining request is permitted.

Note that, at the step S12, it is judged that the minimum bit rate related to this network joining request can be realized when it is less than or equal to the corresponding reference value. Also at th step S13, it is judged that the maximum tolerable jitter related to this network joining request can be satisfied when it is less than or equal to the corresponding reference value. Also, at the step S14, it is judged that the maximum transmission distance related to this network joining request can be achieved when it is less than or equal to the corresponding reference value.

When it is determined to reject, the base station 1 returns a network joining response message indicating the rejection to the requesting source AV data terminal 2.

On the other hand, when it is determined to permit the network joining request, the base station 1 returns a network joining response message indicating the permission to the requesting source AV data terminal 2. In addition, the corresponding number of terminals currently joining for this terminal type is increased by one.

Note that when any wireless terminal 2 of this terminal type is to be handled as leaving, the corresponding number of terminals currently joining is to be decreased by one.

Now, it is possible to maintain an identifier of the currently joining wireless terminal for each terminal device. In this case, when the permission is given to some wireless terminal 2, the base station 1 stores its identifier into a device list corresponding to the type of the wireless terminal 2, and when the wireless terminal 2 (of the specific type) for which the Identifier is stored in the device list for the specific type which is actually maintained by the base station 1 is to be handled as leaving, this identifier will be deleted from the device list for that type.

Note that FIG. 8 is just an example, and it is not absolutely necessary to judge the minimum bit rate, the maximum tolerable jitter and the maximum transmission distance in this order. However, basically, it is preferable to judge them in the order of their Importance. Also, the minimum bit rate, the maximum tolerable jitter and the maximum transmission rate may be judged in parallel.

Also, FIG. 8 is just an example, and it is possible to use the other items for the judgement, in addition to or instead of all or a part of the minimum bit rate, the maximum tolerable jitter and the maximum transmission distance. For example, it is possible to require the AV data terminal to present the application type used by the AV data terminal, and permit the joining only to the AV data terminal having the application type that is set in advance.

It is also possible to provide a table of all combinations of the judgement conditions, such that the judgement can be made by referring to this table when the network joining request is received.

By carrying out the management of the AV data terminals and applying a limitation to the network joining in this way, it is possible to guarantee the quality of the AV data communications.

Also, by using the judgement methods according to the terminal types similarly for each type of terminals other than the AV data terminals, it is possible to guarantee the prescribed communication quality required by the terminals of that type.

FIG. 9A shows an exemplary information contained in the network joining request, in the case where the terminal type, the minimum bit rate, the maximum tolerable jitter, and the maximum transmission distance are to be described in the network joining request, in the exemplary procedure of FIG. 8.

A "frame type" indicates that it is a radio frame of the network joining request message. According to this frame type, the base station 1 recognizes that it is the network joining request message.

A "terminal type" indicates the terminal type described above. For example this information indicates that it is the AV data terminal described above.

Also, the "minimum bit rate", the "maximum tolerable jitter", and the "maximum transmission distance" described above are also contained.

Note that the information other than those shown in FIG. 9A may be also contained in the network joining request message.

For example, as shown in FIG. 9B, an "application type" may be contained. This application type can indicate whether it is an MPEG2 application or a DV application, for example.

Also, for example, the FEC (Forward Error Correction) scheme and capability implemented in the AV data terminal may be contained, and it is possible to judge the permission for the network joining request also according to whether the information regarding this FEC is available in the wireless network managed by the base station 1 or not.

FIG. 1 shows an exemplary packet configuration for the network joining request in the case of using the IEEE 802.11 as the wireless network protocol.

In the IEEE 802.11, the Association to the base station 1 is requested by using the Association Request frame as the network joining request message. At this point, the Capability Information field plays an important role. The information corresponding to the frame type of FIG. 9A is described inside the header portion of FIG. 10. As for the information corresponding to the terminal type of FIG. 9A, the terminal which reserves the bandwidth can be identified by sub-fields such as CF Pollable or CF Poll Request or Privacy in the Capability Information field. The information on the maximum tolerable jitter, the maximum transmission distance, and the application type of FIG. 9B can be notified to the base station by using a Reservation region. This Reservation region may be used for identifying the terminal in further detail.

Figure 11:
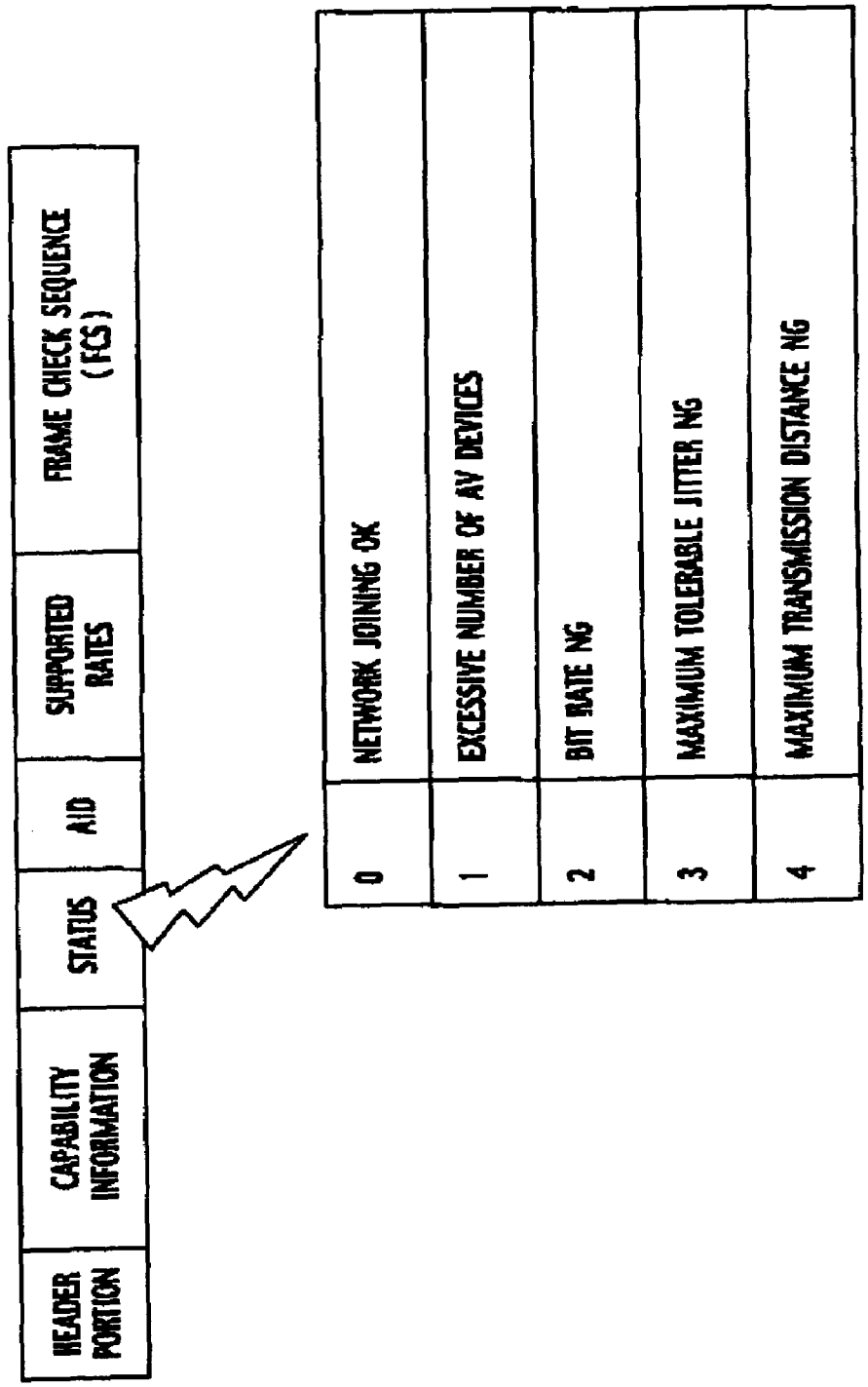
FIG. 11 is a diagram showing an exemplary configuration of a network joining response frame in case of using IEEE 802.11 according to the first embodiment of the present invention.

FIG. 11 shows an exemplary packet configuration of the network joining response message for the network joining request in the case of using the IEEE 802.11 as the wireless network protocol.

In the IEEE 802.11, the Association Response frame is used as the network joining response message to the wireless terminal 2.

In this network joining response message, the judgement result is contained. Basically, the judgement result is contained in the Status field, and the coding shown in FIG. 11 is used to indicate the permission when the joining is permitted, or the reason for the rejection when the joining is rejected.

Note that the coding shown in FIG. 11 corresponds to the exemplary procedure of FIG. 8. Also, the reasons for the rejection other than those shown in FIG. 11 may be contained in the Status field.

Note that FIG. 11 shows an exemplary coding for the case of indicating only one reason for the rejection, but it is also possible to notify the presence/absence of each reason for the rejection in the case of the rejection, by using the bit map, for example.

Next, an exemplary ease of carrying out the AV data transfer between the AV data terminals 2 will be described.

Here, the wireless terminal on a side for transmitting the AV data will be referred to as an AV data terminal T, and the wireless terminal on a side for receiving the AV data will be referred to as an AV data terminal R.

Figure 12:
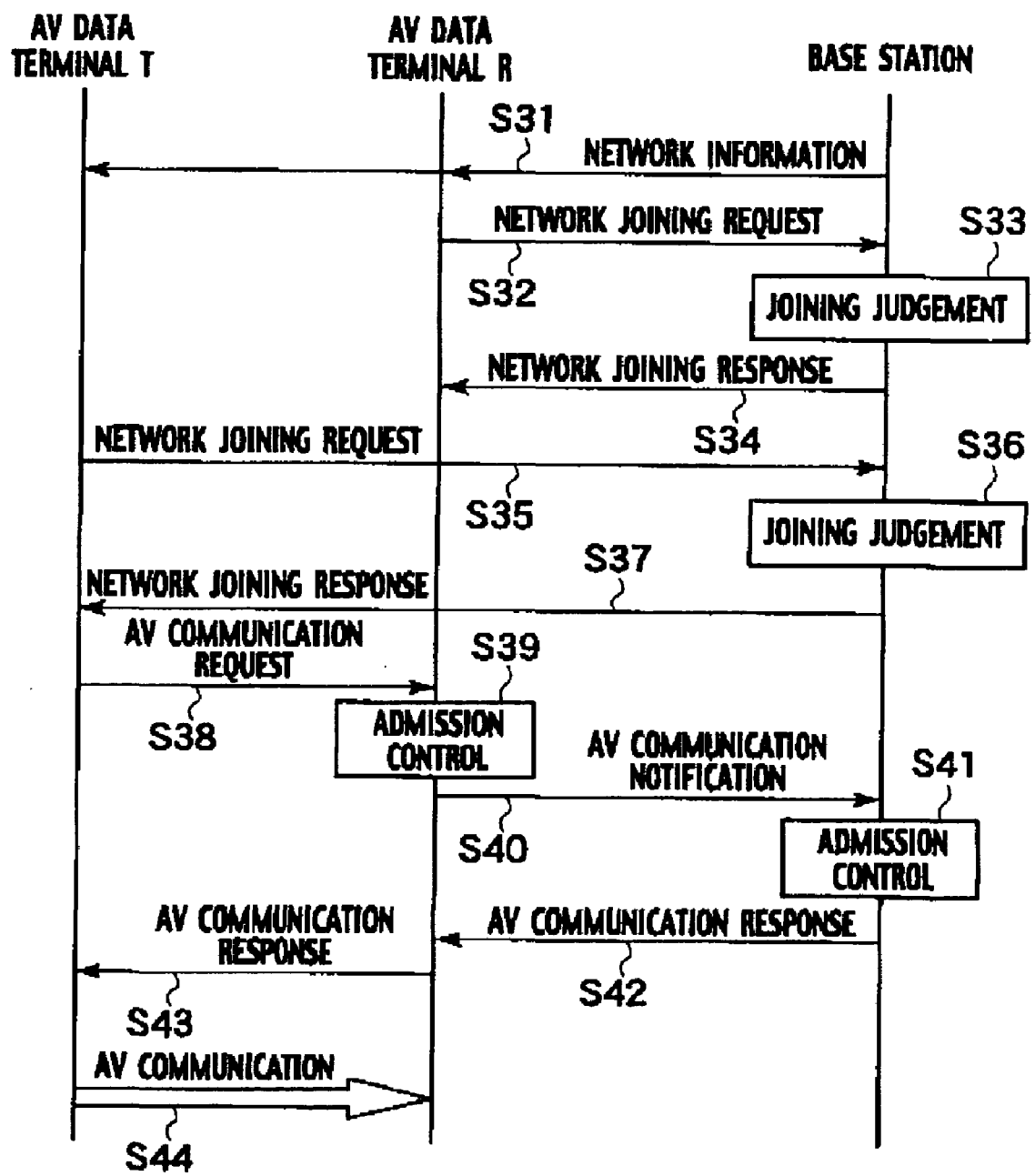
FIG. 12 is a sequence chart showing one exemplary operation sequence at a time of an AV data communication according to the first embodiment of the present invention.

FIG. 12 shows an exemplary processing sequence in this case.

Similarly as FIG. 4, the information regarding the management target wireless network is broadcasted from the base station 1 (step S31). Then, the AV data terminal R makes the network joining request (step S32).

The base station 1 receives this network joining request and carries out the joining judgement (step S33). Here, it is assumed that the permission of the joining is determined. In this case, the base station 1 returns the network joining response indicating the permission to the AV data terminal 2 (step S34).

It is also assumed that the network joining request, the joining judgement, and the network joining response indicating the permission are carried out similarly for the AV data terminal T (steps S35 to S37).

Note that an order of a series of processing of the steps S32 to S34 and a series of processing of the steps S35 to S37 is arbitrary. Also, a series of processing of the steps S32 to S34 and a series of processing of the steps S35 to S37 may be carried out in parallel.

By the above, the AV data terminal T and the AV data terminal R can join the network, and as a result, it is possible to carry out the AV data transfer between the AV data terminal T and the AV data terminal R.

Next, the AV data terminal T transmits the AV communication request for requesting the AV data communication with the AV data terminal R, to the AV data terminal R (step S38). This AV communication request contains information such as a bit rate, a network occupation time within one period, etc., for example.

When this AV communication request is received, the AV data terminal R carries out an admission control for judging the permission or the rejection for this request, according to the above described information contained in the AV communication request.

Then, when the request is to be permitted, the AV data terminal R transmits the AV communication notification indicating that the AV data communication will be carried out, to the base station 1, so as to obtain the permission for the periodic use of the network (step S40). The AV data requires the communication at nearly constant interval, and the limitation for the fluctuation (jitter) of the interval often exists.

When this AV communication notification is received, the base station 1 carries out an admission control for judging the permission or the rejection of the use of the network, according to the network utilization state or the like (step S41).

Then, when the use of the network is to be permitted, the base station 1 returns the AV returns the AV communication response indicating this fact to the AV data terminal R (step S42).

When this AV communication response indicating the permission to use the network is received, the AV data terminal R returns the AV communication response to the AV data terminal T (step S43). After receiving this AV communication response, the AV data terminal T becomes possible to carry out the AV data communication with the AV data terminal R.

Note that, in the AV communication response, it is possible to describe the information indicating the fact that the AV data communication is permitted, and the periodic timing, the bit rate, and the duration of time by which the network will be occupied. In this case, the AV data terminals T and R can learn the information indicating the fact that the AV data communication is permitted, and the periodic timing, the bit rate, and the duration of time by which the network will be occupied, by receiving this AV communication response.

Then, the transfer of the desired AV data is carried out between the AV data terminal T and the AV data terminal R (step S44).

Figure 13:
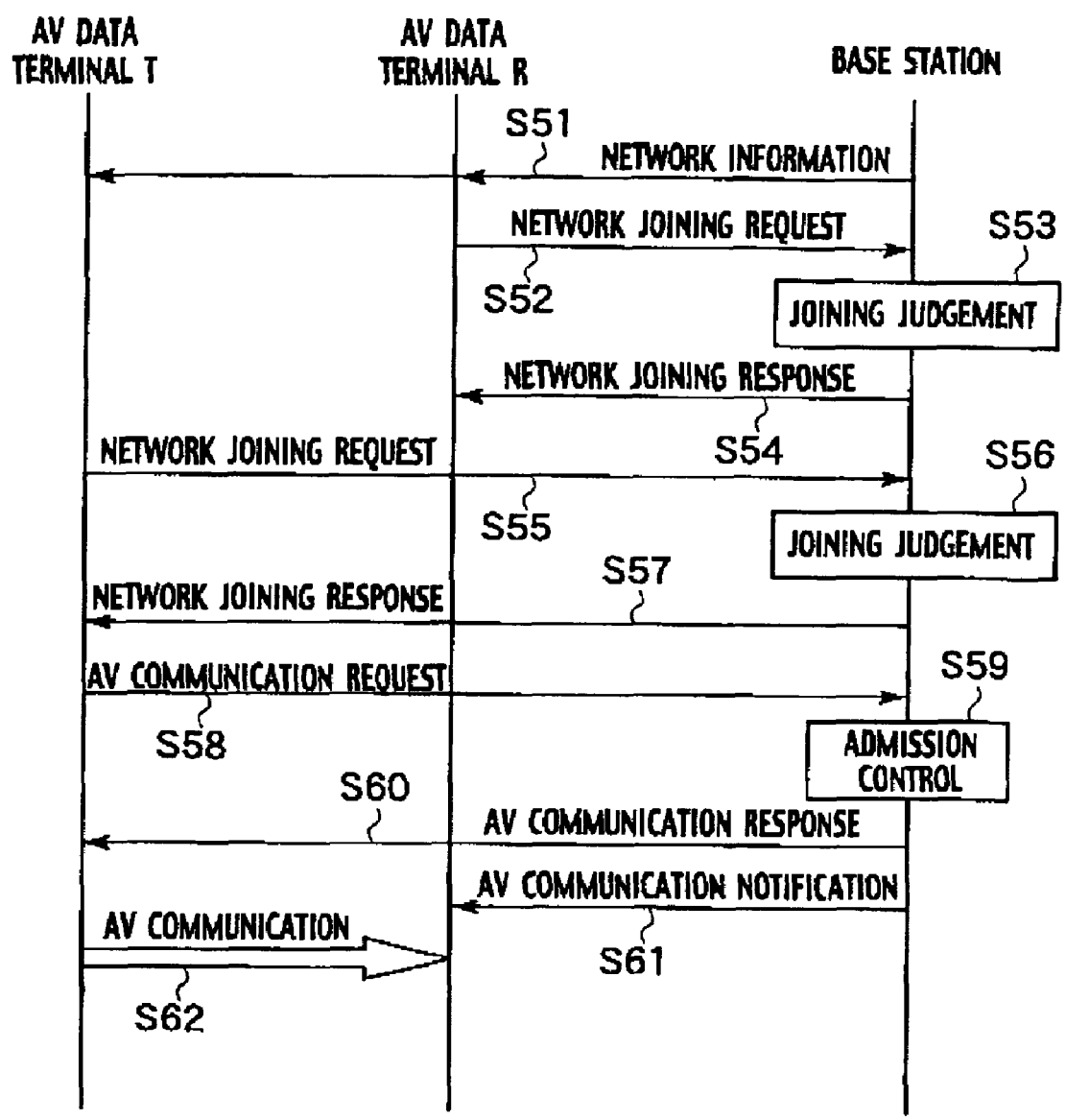
FIG. 13 is a sequence chart showing another exemplary operation sequence at a time of an AV data communication according to the first embodiment of the present invention.

FIG. 13 shows another exemplary processing sequence in this case. In FIG. 13, the steps S51 to S57 by which the AV data terminals T and R join the wireless network are similar to the steps S31 to S37 of FIG. 12, but the procedure for starting the AV data communication is different from FIG. 12. In FIG. 12, the admission control operations are carried out at two steps of S39 and S41 by the AV data terminal R and the base station 1, respectively, but in FIG. 13, these admission control operations are carried out by the base station 1 at the step S59.

Namely, in this case, the AV data terminal T transmits the AV communication request to the base station 1 rather than the AV data terminal R, so as to request the AV data communication with the AV data terminal R and to obtain the permission for the periodic use of the network (step S58). This AV communication request contains information such as a bit rate, a network occupation time within one period, etc., for example, as described above.

When this AV communication request is received, the base station 1 carries out an admission control for judging the permission or the rejection for this request, according to the above described information contained in the AV communication request and the network utilization state or the like (step S59).

Then, when the network use is to be permitted, the base station 1 returns the AV communication response and notification indicating this fact to each one of the AV data terminal T and the AV data terminal R (steps S60, S61).

Then, the transfer of the desired AV data is carried out between the AV data terminal T and the AV data terminal R (step S62).

Now, with reference to FIG. 14, the bandwidth reservation in the AV data communication will be described.

The radio frame is repeated in cycles of a period T. In the IEEE 802.11, such a cycle is formed as the beacon is periodically transmitted from the base station 1.

The first AV data communication (indicated as A in FIG. 14) is capable of communicating as the joining is permitted at the cycle $C_1$ with the low bit rate and the maximum tolerable jitter $\Delta t$. On the other hand, the second AV data communication (indicated as B in FIG. 14) is capable of communicating in cycles of a period T as the joining is permitted at the cycle $C_2$ with the high bit rate.

These AV data communications are managed by the base station 1, and the network joining of the AV data terminal 2 is judged on the base of this management.

Figure 14:
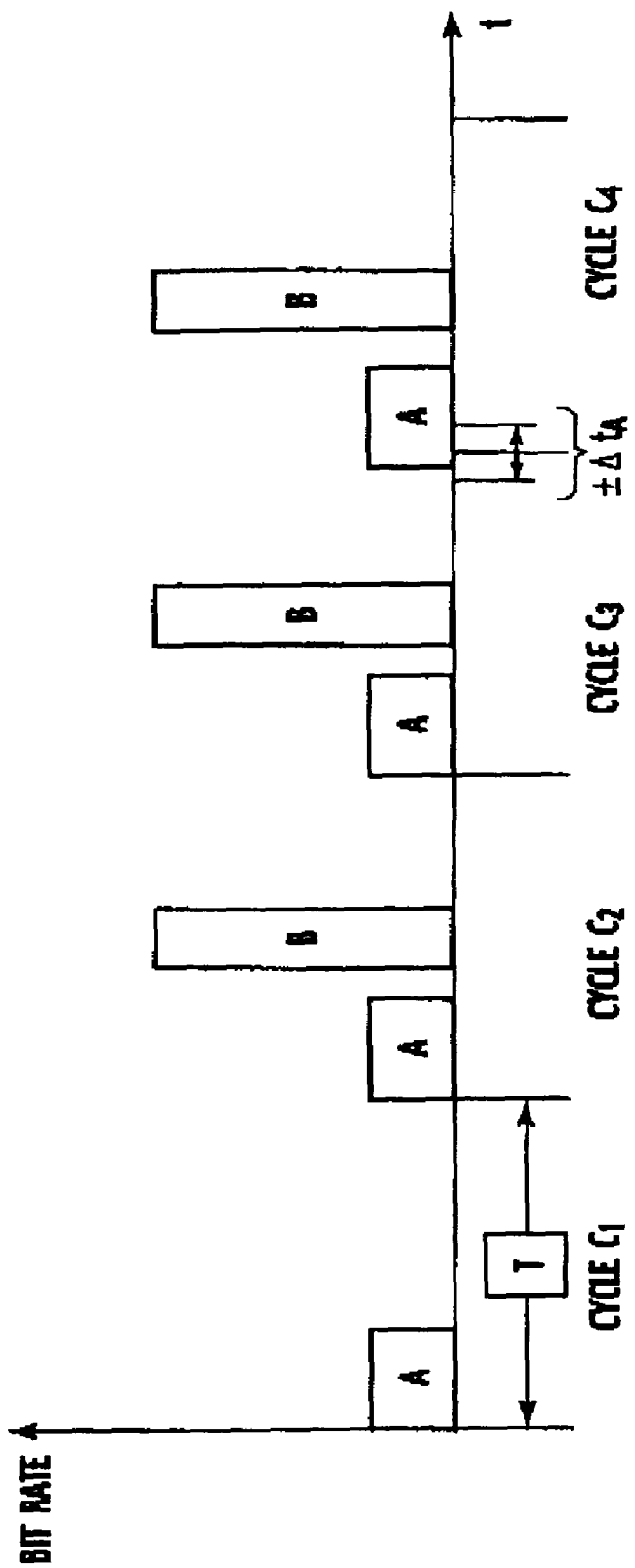
FIG. 14 is a diagram showing an exemplary case for explaining a bandwidth reservation in AV data communications according to the first embodiment of the present invention.

As in FIG. 14, it is possible to consider the case where the bit rates are different among the AV data terminals 2. For this reason, it is possible to manage the number of terminals using each bit rate, and this information may be used for the judgement of the network joining.

As described with references to FIG. 12 and FIG. 13, before carrying out the AV data communication, a preparation for the AV data communication is carried out with the correspondent AV data terminal 2 or the base station 1. For this preparation, various protocols can be used. In the case of the IEEE 1394, the AV/C protocol is used, so that its messages can be mounted on the radio frame and utilized. It is also possible to reserve the bandwidth and the periodic timing similarly by using the protocol such as RTSP, SIP, H.245, H.323, etc.

Figure 15:
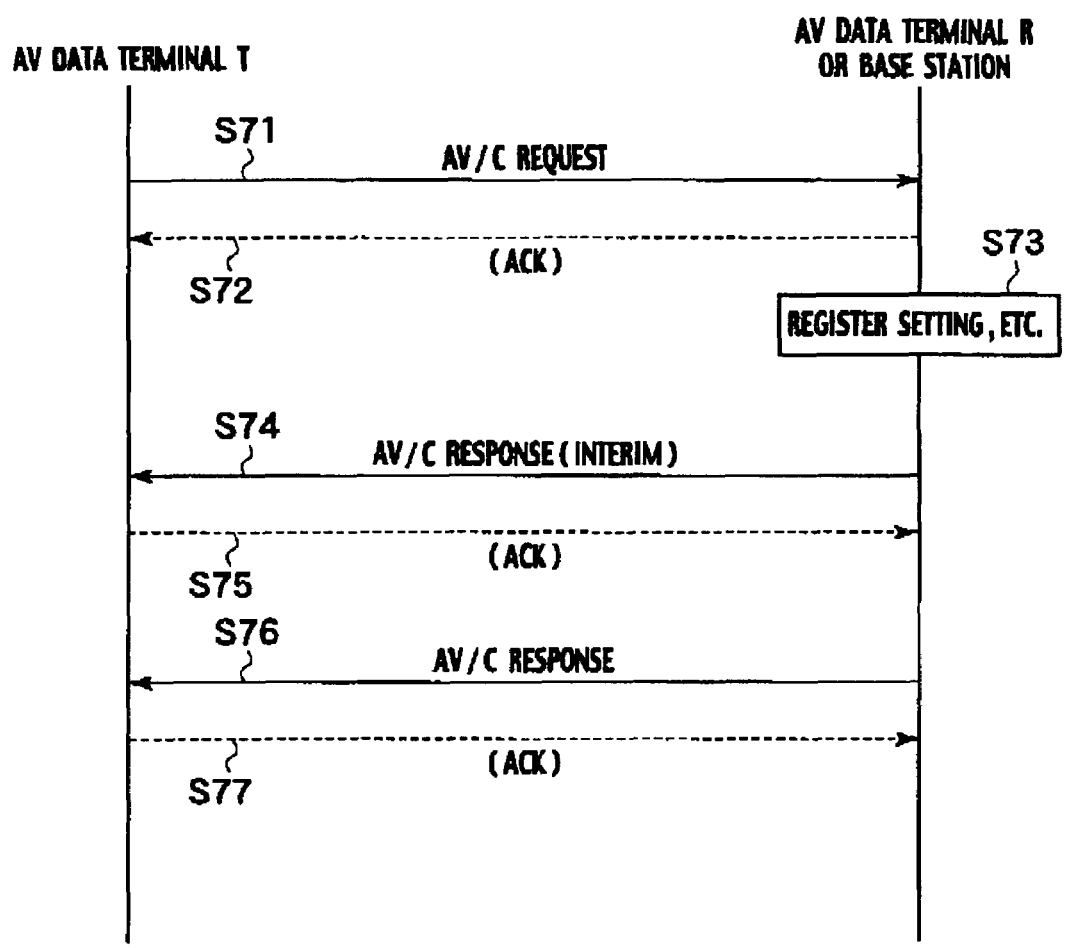
FIG. 15 is a sequence chart showing an exemplary operation sequence for an AV data communication setting based on AV/C protocol according to the first embodiment of the present invention.

FIG. 15 shows an exemplary case of using the AV/C command protocol in the processing of FIG. 12 or FIG. 13.

The AV data terminal T that wishes to carry out the AV data communication transmits an AV/C Request message, which is mounted on the radio frame (step S71). This message corresponds to the AV communication request of the step S38 of FIG. 12 or the step S58 of FIG. 13. Note that, in the case of using the IEEE 802.11 protocol, an acknowledgement Ack is returned in response to this Request message frame (step S72).

At the side that received this message (the AV data terminal R in the case of FIG. 12, the base station 1 in the case of FIG. 13), the information such as bandwidth is set in a register space utilized by the AV/C protocol (step S73). Then, a Response is returned to the AV data terminal T (step S74). This message corresponds to the AV communication response of the step S43 of FIG. 12 or the step S60 of FIG. 13.

Note that, in the AV/C protocol, the Response should be returned within 100 ms basically, but when this is difficult, the INTERIM can be declared to postpone the formal issuance of the Response (step S76) Also, in the case of the IEEE 802.11, the acknowledgement Ack is returned to all the messages (steps S75, S77).

In this way, the preparation before the AV data communication can be made.

Note that the above description is directed to the case of always giving a permission without any limitation when the network joining request is to be permitted, but it is also possible to given a permission with a limitation when a prescribed condition holds, for example. In this case, the content of the limitation is described in the network joining response and notified to the wireless terminal 2. There are many possible variations for the limitation, such as a limitation to limit the period of time during which the network joining is possible when the network is congested, for example.

As described, according to the first embodiment, it is possible to provide a wireless base station, a network joining control method, a wireless terminal, and a communication control method capable of guaranteeing the communication quality required by each wireless terminal of each terminal type.

Also, according to the first embodiment, it is possible to utilize the radio bandwidth effectively, by setting the bandwidth larger than the bandwidth requested by the application to the wireless communication section, for example. It is possible to make sure that the transmitted contents will be received, by making this setting according to the information regarding the data storage unit of the receiving side or the information regarding the error correction capability.

Referring now to FIG. 16 to FIG. 28, the second embodiment of the present invention will be described in detail.

Figure 16:
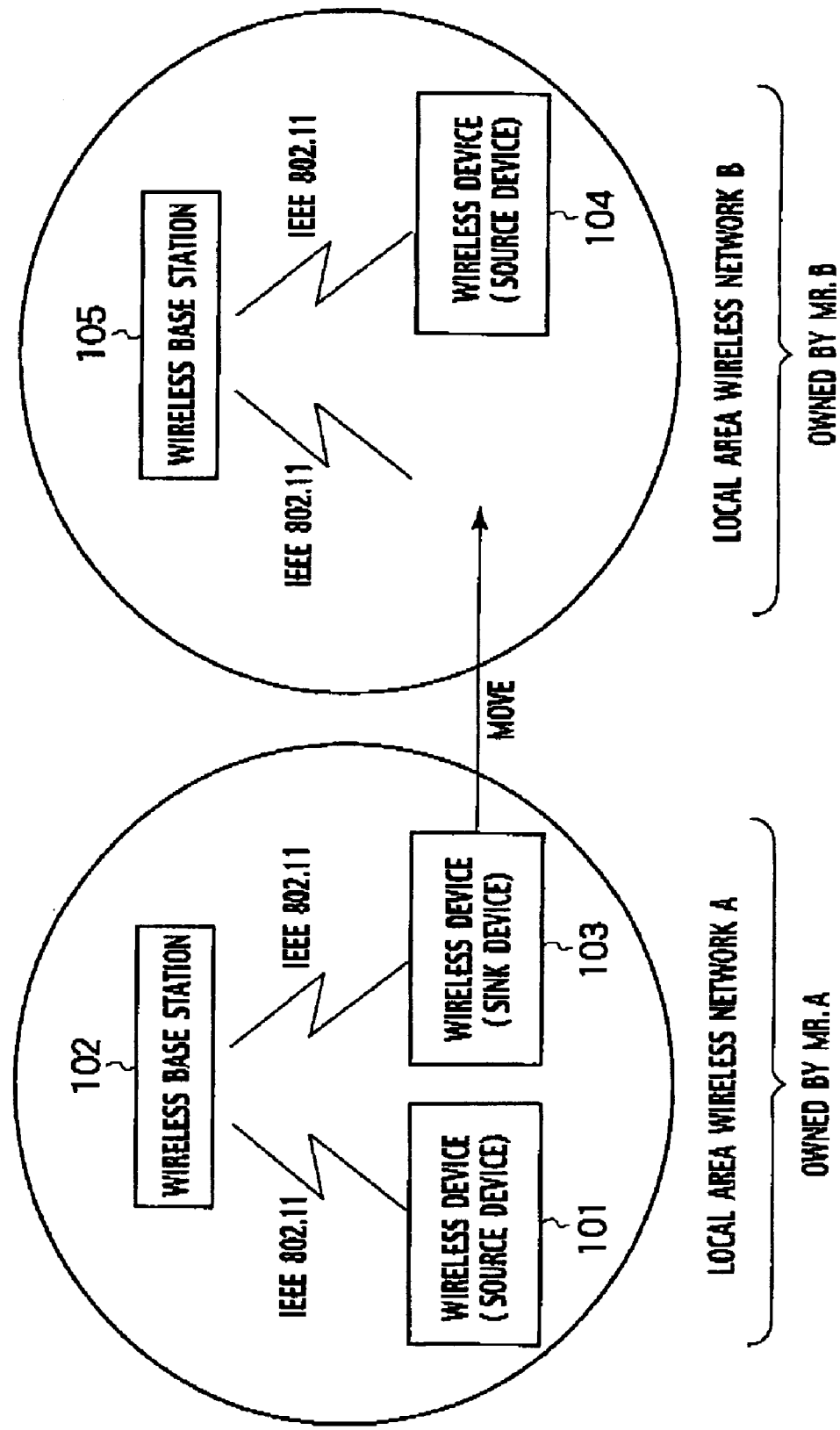
FIG. 16 is a schematic diagram showing an exemplary overall configuration or a wireless communication system according to the second embodiment of the present invention.

FIG. 16 shows an overall configuration of a wireless communication system according to the second embodiment, that contains a transmitting device, a receiving device and a wireless base station. The wireless communication system of FIG. 16 has a wireless device (referred hereafter as a source device) 101 having a contents reproduction function such as that of a DVD player and a wireless interface for transmitting contents, and a wireless device (referred hereafter as a sink device) 103 for receiving the contents transmitted from the source device 101 through a wireless base station 102. These source device 101, wireless base station 102 and sink device 103 are connected to a local area wireless network A.

As shown in FIG. 16, another local area wireless network B different from the local area wireless network A is also formed, and a wireless device (referred hereafter as a source device) 104 having functions similar to the source device 101 and a wireless base station 105 having functions similar to the wireless base station 102 are connected to this local area wireless network B.

Here, the case where the sink device 103 moves to an area in which the local area wireless network B is accessible. Here, "move" is not necessarily a physical moving, and the case of changing the network to which it belongs by changing the configuration is also included in this case.

Namely, the sink device 103 is assumed to be located within an area at which the network A formed by the wireless base station 102 and the network B formed by the wireless base station 105 are both accessible. It is also assumed that the source device 101, the wireless base station 102 and the sink device 103 are owned by one person (referred hereafter as Mr. A), and the source device 104 and the wireless base station 105 are owned by another person (referred hereafter as Mr. B).

FIG. 16 assumes the case where each one of the source device 101 and the sink device 103 directly carries out the wireless communication through the wireless base station 102, but this embodiment is also applicable to the case where the source device 101 and the sink device 103 do not have the wireless communication function and a bridge device (not shown) connected by wires to the source device 101 and the sink device 103 carries out the wireless communication through the wireless base station 102, or the case where the source device 101 and the sink device 103 have the wireless communication function but carry out the wireless communication with the wireless base station 102 through the bridge device.

Here, the contents are video data or audio data such as MPEG4 data, for example, which are assumed to be transmitted after applying the copyright protection. It is also assumed that the contents transmitted by the source device 101 are owned by Mr. A, so that the contents can be copied or viewed only by the private use of Mr. A. Similarly, it is also assumed that the contents transmitted by the source device 104 are owned by Mr. B, so that the contents can be copied or viewed only by the private use of Mr. B, and Mr. A is not allowed to copy or view the contents owned by Mr. B, regardless of whether Mr. B permits or not.

Here, the local area wireless network is assumed to be the IEEE 802.11. The IEEE 802.11 is a kind of the wireless LAN which is implemented in many PCs currently, and which is expected to be implemented in various AV devices in the future.

The following description is directed to the configuration for realizing the case where the sink device 103 owned by the Mr. A is capable of receiving the contents only from the source device 101 through the wireless base station 102 owned by Mr. A, the access to the source device 104 through the wireless base station 105 owned by Mr. B is limited, and at the same time the transmission of the contents by the source device 104 owned by Mr. B to the sink device 103 owned by Mr. A is also limited, in the situation shown in FIG. 18.

Figure 17:
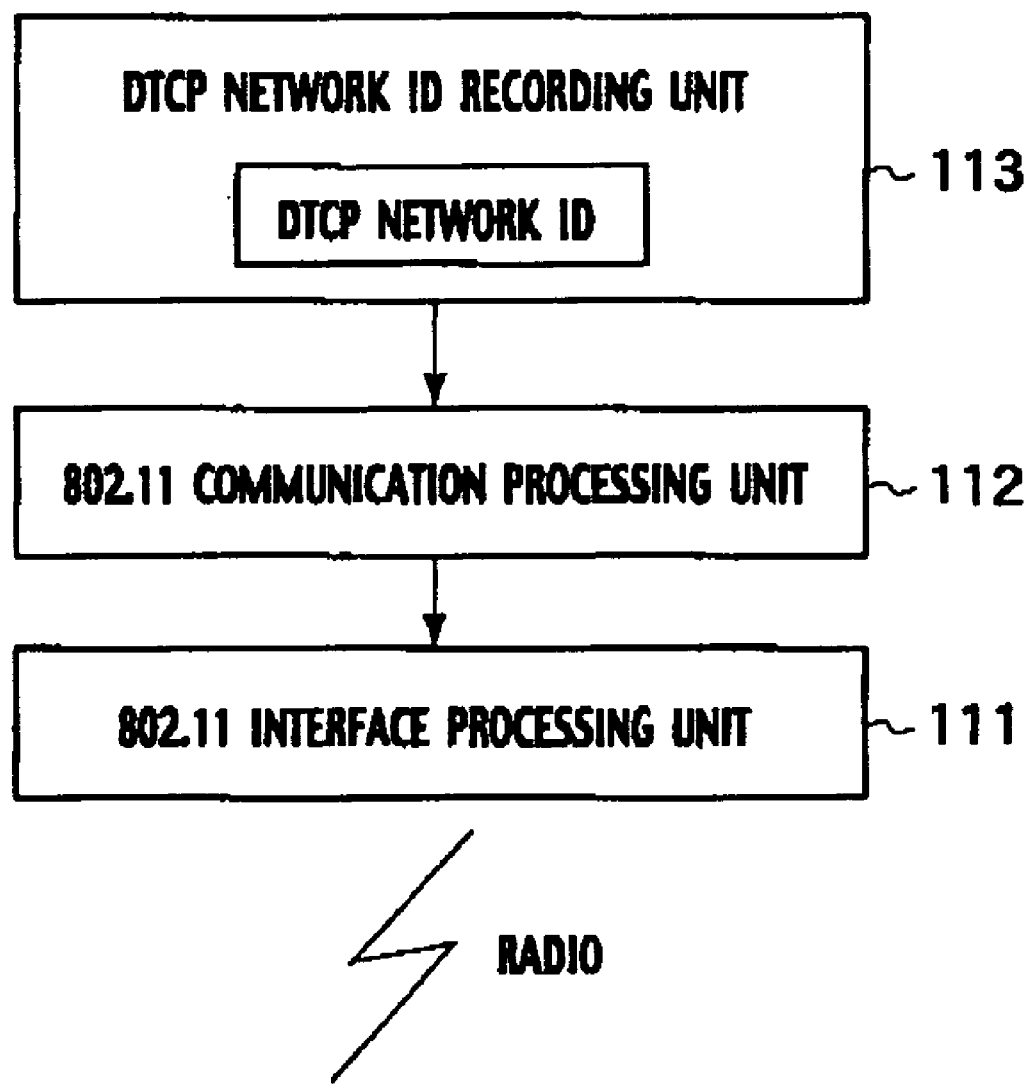
FIG. 17 is a block diagram showing an exemplary internal configuration of a wireless base station according to the second embodiment of the present invention.

FIG. 17 shows an exemplary internal configuration of the wireless base station 102 or 105, As shown in FIG. 17, the wireless base station 102 or 105 has a 802.11 interface processing unit 111 for executing the IEEE 802.11 physical layer processing, a 802.11 communication processing unit 112 for executing the IEEE 802.11 datalink layer processing, and a DTCP network ID recording unit 113 for recording a DTCP network ID.

The DTCP network ID is a value uniquely defined for a device at a time of manufacturing or selling by a manufacturer or a seller, and the owner can learn but cannot change this value.

Figure 18:
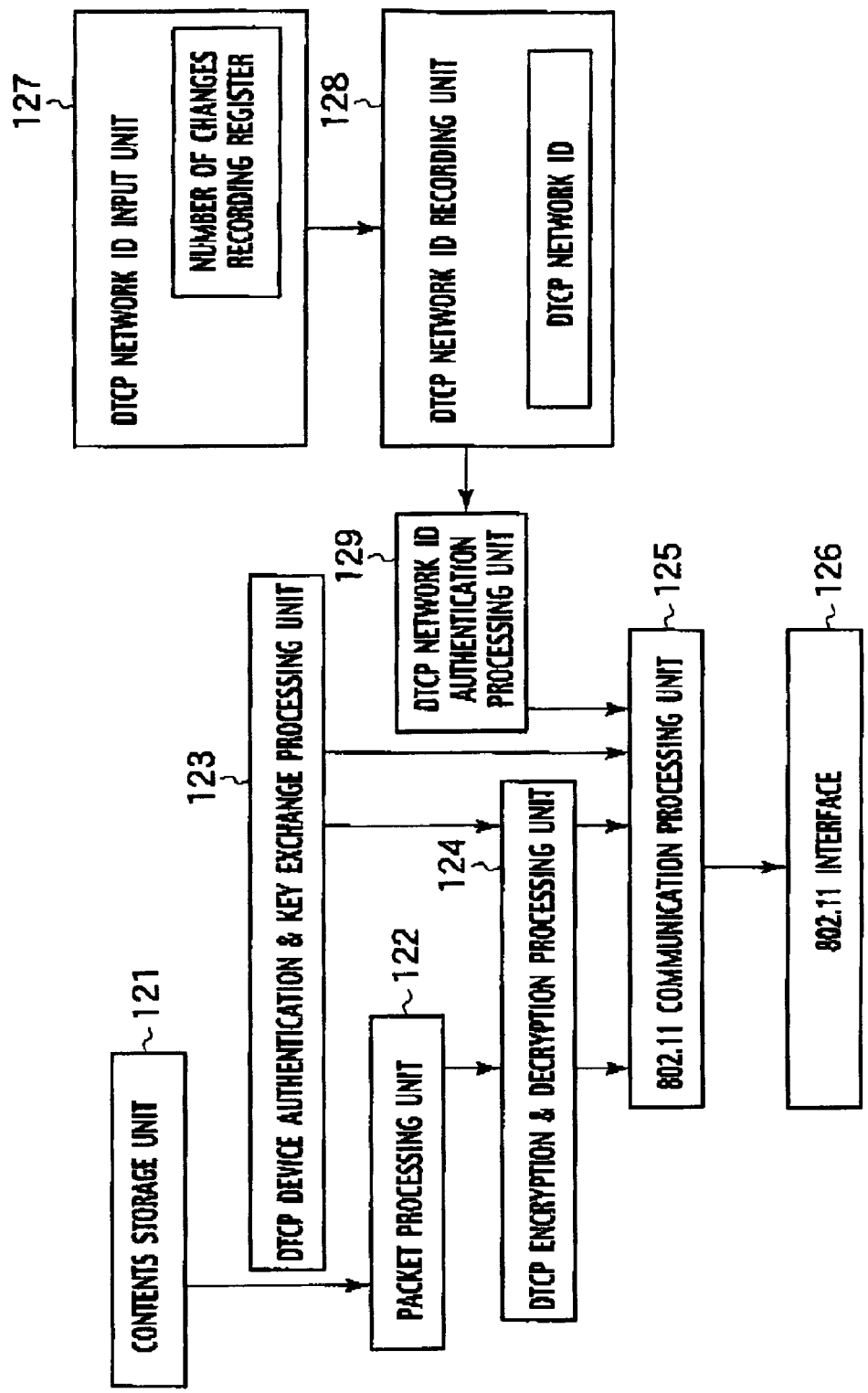
FIG. 18 is a block diagram showing an exemplary internal configuration of a source device according to the second embodiment of the present invention.

FIG. 18 shows an exemplary internal configuration of the source device 101 or 104. As shown in FIG. 18, the source device 101 or 104 has a contents storage unit 121 for storing contents, a packet processing unit 122 for reading out the contents from the contents storage unit 121 and converting them into IEEE 802.11 packets, a DTCP device authentication and key exchange processing unit 123 for carrying out the copyright protection processing, a DTCP encryption and decryption processing unit 124 for encrypting or decrypting the transmission data, a 802.11 communication processing unit 125 for executing the IEEE 802.11 datalink layer processing, a 802.11 interface processing unit 126 for executing the 802.11 physical layer processing, a DTCP network ID input unit 127 for changing a value of the DTCP network ID, a DTCP network ID recording unit 128 for recording the DTCP network ID, and a DTCP network ID authentication processing unit 129 for carrying out the authentication of the DTCP network ID.

The initial value of the DTCP network ID is a value determined by the manufacturer or seller. The DTCP network ID recording unit 128 has a function for limiting the number of the DTCP network IDs that can be recorded to a constant value.

Here, the DTCP (Digital Transmission Contents Protection) is the copyright protection scheme which is the de facto standard in the IEEE 1394, USB, etc., In this scheme, the device authentication and key exchange are carried out between the transmitting device and the receiving device, for the contents such as AV data for which the copyright protection is necessary, there is provided a mechanism for transferring the AV data after encrypting it.

Figure 19:
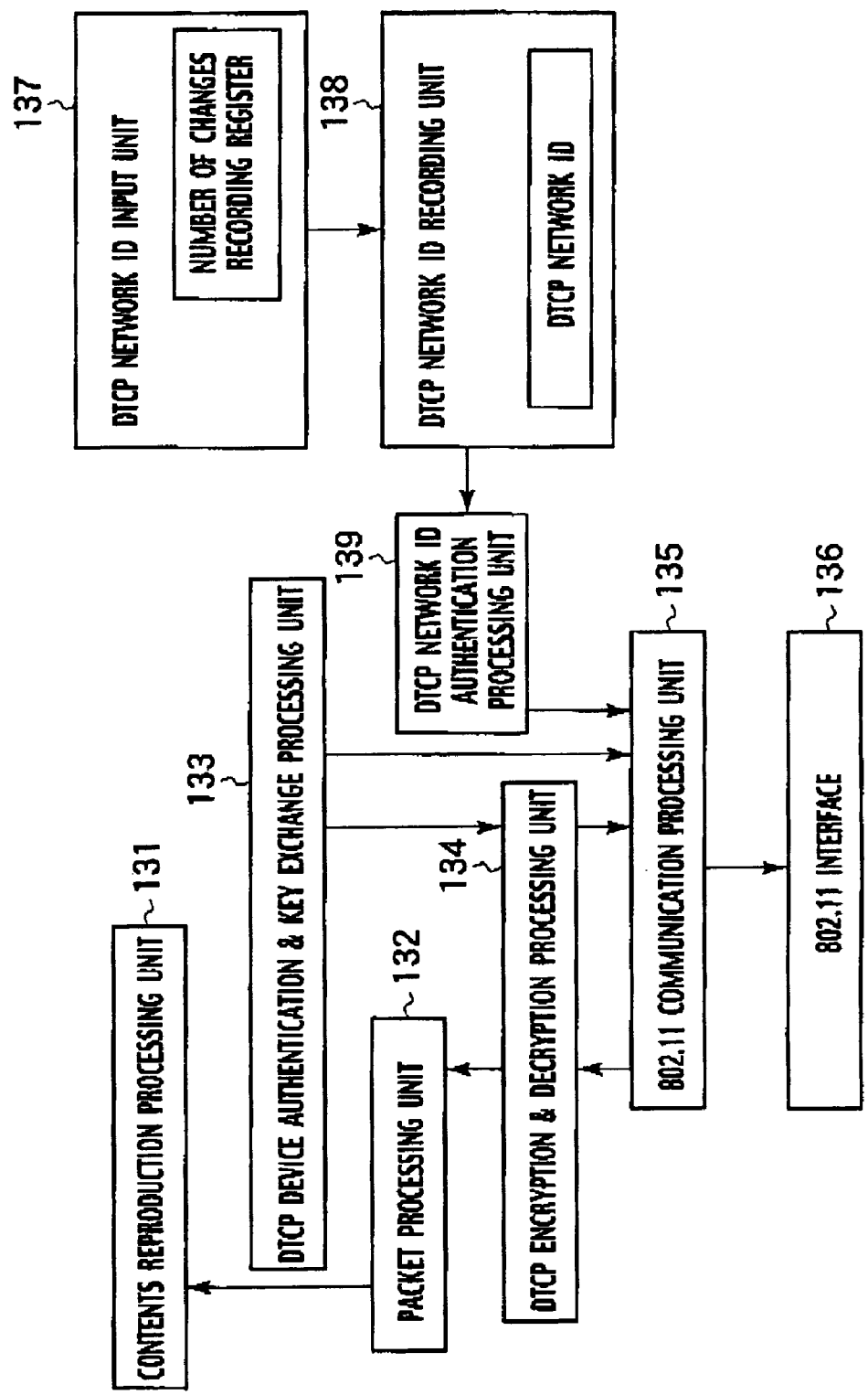
FIG. 19 is a block diagram showing an exemplary internal configuration of a sink device according to the second embodiment of the present invention.

FIG. 19 shows an exemplary internal configuration of the sink device 103. As shown in FIG. 19, the sink device 103 has a contents reproduction processing unit 131 for carrying out a processing to output packets to a display or the like, a packet processing unit 132 for converting the IEEE 802.11 packets received from the base station into the contents data, a DTCP device authentication and key exchange processing unit 133 for carrying out the copyright protection processing, a DTCP encryption and decryption processing unit 134 for encrypting or decrypting the transmission data, a 802.11 communication processing unit 135 for executing the IEEE 802.11 datalink layer processing, a 802.11 interface processing unit 136 for executing the 802.11 physical layer processing, a DTCP network ID input unit 137 for changing a value of the DTCP network ID, a DTCP network ID recording unit 138 for recording the DTCP network ID, and a DTCP network ID authentication processing unit 139 for carrying out the authentication of the DTCP network ID.

Here, what is important is the DTCP network ID input units 127 and 137. As described above, the DTCP network ID recorded at the wireless base station 102 cannot be rewritten. On the other hand, the source device 103 and the sink device 103 can change the DTCP network ID to arbitrary value by using the DTCP network ID input unit. However, each one of the DTCP network ID input units 127 and 137 is provided with a register for recording the number of changes, and the DTCP network ID cannot be changed more than a prescribed number of times. By this mechanism, the user has a limited number of times for changing the network ID.

Figure 20:
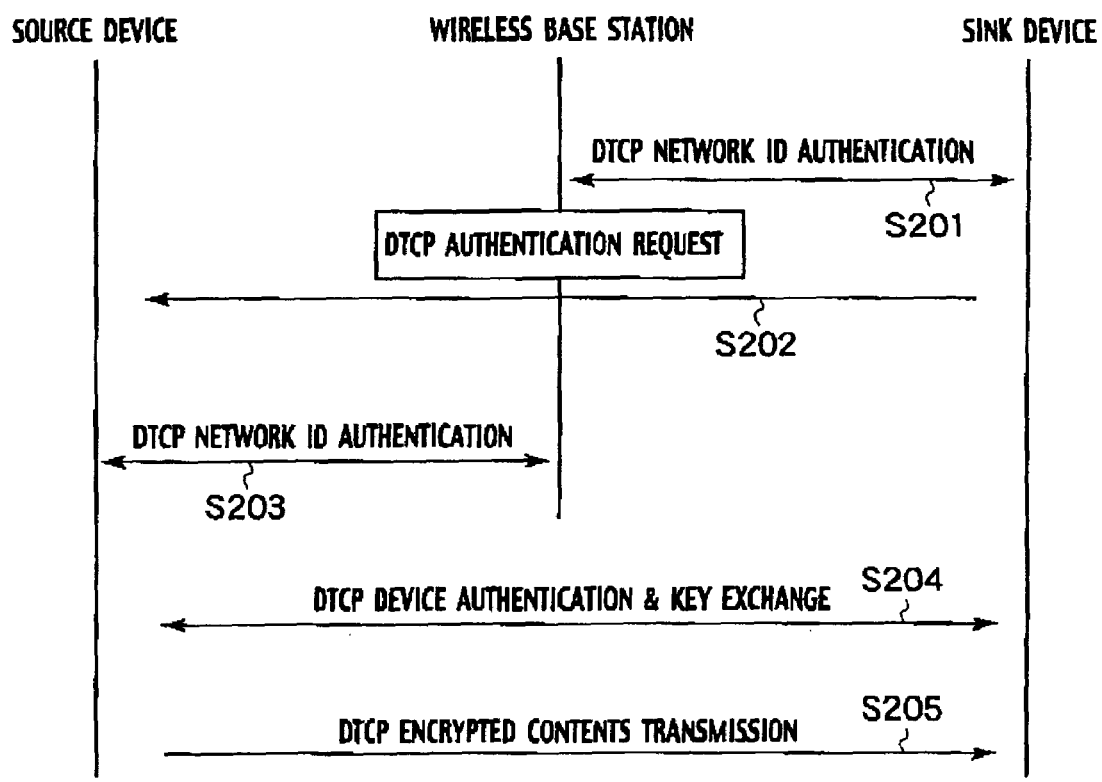
FIG. 20 is a sequence chart showing a processing procedure of a wireless communication system according to the second embodiment of the present invention.

FIG. 20 shows a processing procedure of the wireless communication system in this embodiment. First, the DTCP network ID authentication is carried out between the sink device 103 and the wireless base station 1.02 (step 5201). When this authentication succeeds, the sink device 103 makes the DTCP authentication request to the source device 101 (step S202).

Upon receiving this request, the DTCP network ID authentication is carried out between the source device 101 and the wireless base station 102 (step S203). Then, the DTCP device authentication and key exchange are carried out between the source device 101 and the sink device 103 (step S204). Then, the source device 101 transmits the contents encrypted by using the key obtained by the key exchange to the sink device 103 through the wireless base station 102 (step S205).

Figure 21:
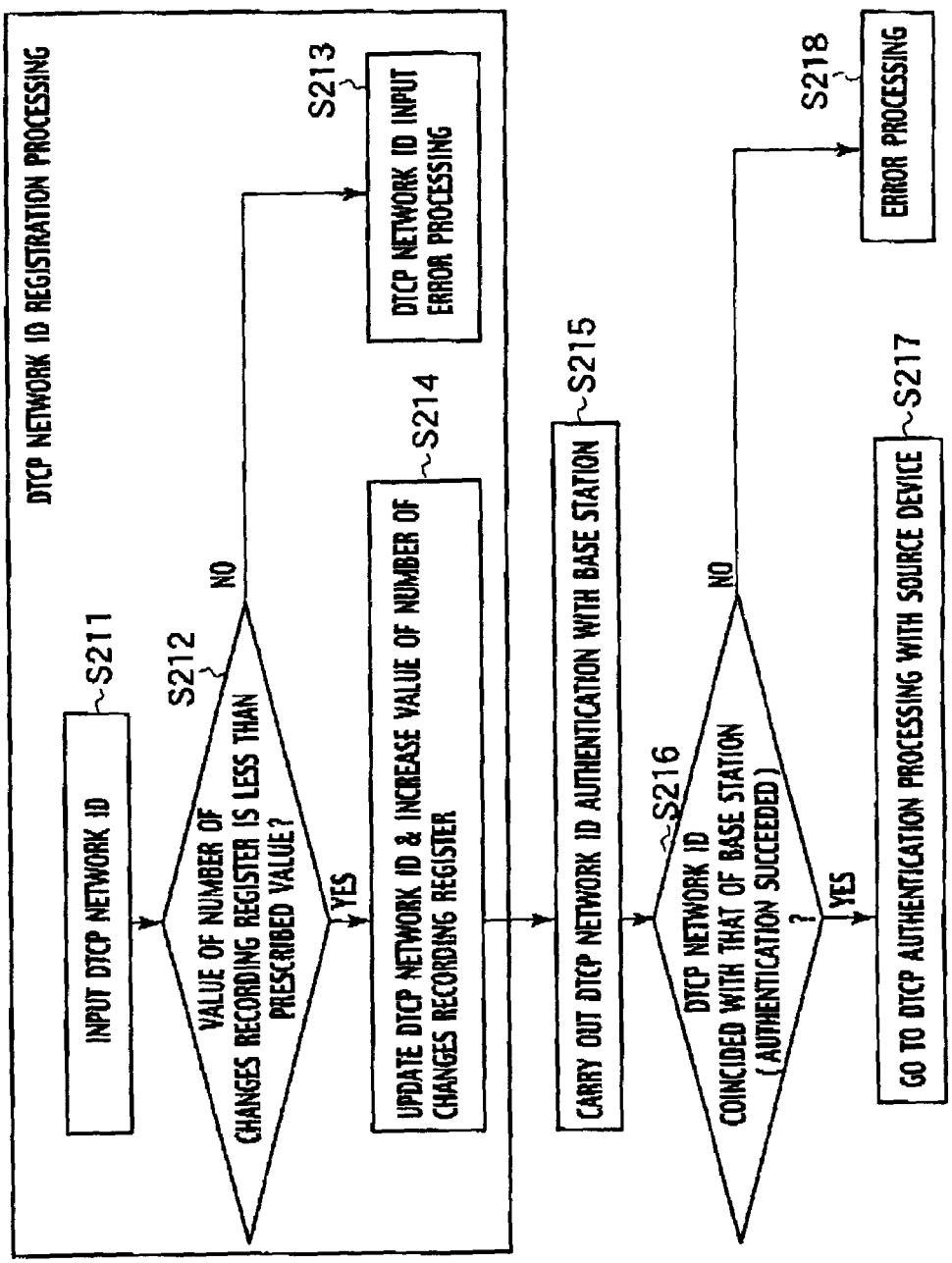
FIG. 21 is a flow chart showing a processing procedure of a sink device according to the second embodiment of the present invention.

FIG. 21 shows a processing procedure of the sink device 3. First, the user registers the same DTCP network ID as the wireless base station 102 as the DTCP network ID of the sink device 103 in advance (step S211.).

Next, whether a value of a number of changes recording register for the DTCP network ID is less than a prescribed value or not is judged (step S212), and if it is greater than or equal to the prescribed value, the DTCP network ID cannot be changed so that a prescribed error processing is carried out (step S213).

If the value of the number of changes recording register is less than the prescribed value, the value of the DTCP network ID is changed and a value of the number of changes recording register is increased (step S214). This series of processing will be referred to as a DTCP network ID registration processing.

Note that if the value of the DTCP network ID of the sink device 103 is the same as that of the wireless base station 102, the processing of the steps S211 to S214 is unnecessary.

Next, the contents transmission and reception processing is started. First, before carrying out the DTCP device authentication and key exchange, a mutual authentication processing to check whether values of the DTCP network ID of the wireless base station 102 and the DTCP network ID of the sink device 103 coincide or not is carried out (step S215). This authentication uses the value of the DTCP network ID as the authentication key, and the secret key cryptosystem as defined by ISO/IEC 9798-2. It is also possible to check whether the DTCP network IDs coincide or not by mutually transmitting the DTCP network ID by attaching a signature and verifying that signature at a receiving side device.

When it is guaranteed that the packets are surely not altered at the wireless link layer and they are those transmitted from the sink device 103 to the wireless base station 102, the authentication processing in conjunction with the encryption is not absolutely necessary and it is also possible to simply transmit the value of the DTCP network ID to the wireless base station 102. In the following, this procedure is collectively referred to as the DTCP network ID authentication.

When the DTCP network ID authentication succeeded (step S216 YES), the source device 101 transmits the DTCP device authentication and key exchange request to the sink device 103 (step S217), whereas when the DTCP network ID authentication failed, the error processing is carried out (step S218).

Figure 22:
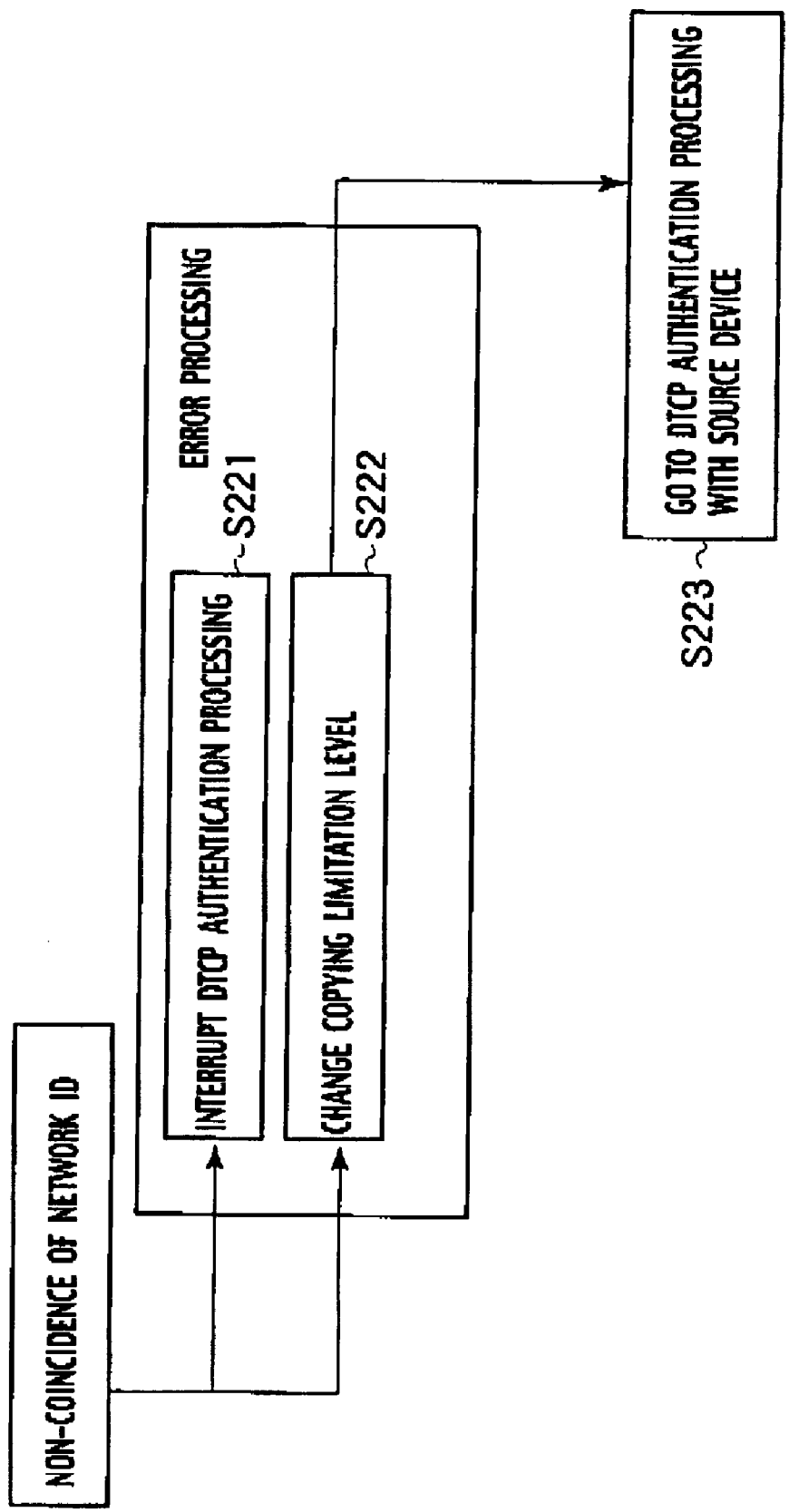
FIG. 22 is a flow chart showing a procedure of an error processing at a step S18 in the processing procedure of FIG. 21.

FIG. 22 shows a procedure of the error processing at the step S218 of FIG. 21. The error processing can use: (1) a method for interrupting the DTCP authentication (step S221), or (2) a method for changing the copying limitation level (step S222), for example.

In the case of (1), it is possible to use a method for not transmitting anything to the source device or a method for transmitting an error message for rejecting the DTCP authentication request. As for the case of (2), in the DTCP, a plurality Of levels called CCI (Copy Control Information) are defined in order to define the copying limitation by the copyright owner with respect to the data to be transmitted. These levels include Copy Never and No More Copies which prohibit the copying, Copy One Generation which allows the copying only for the one generation, and Copy Free which allows the copying freely. Even when the user specifies the receiving of the contents at a level of Copy One Generation with respect to the sink device, if the DTCP network ID authentication between the sink device and the wireless base station fails, the sink device is requested to receive the contents at a tighter copying limitation level of Copy Never or No More Copies.

Figure 23:
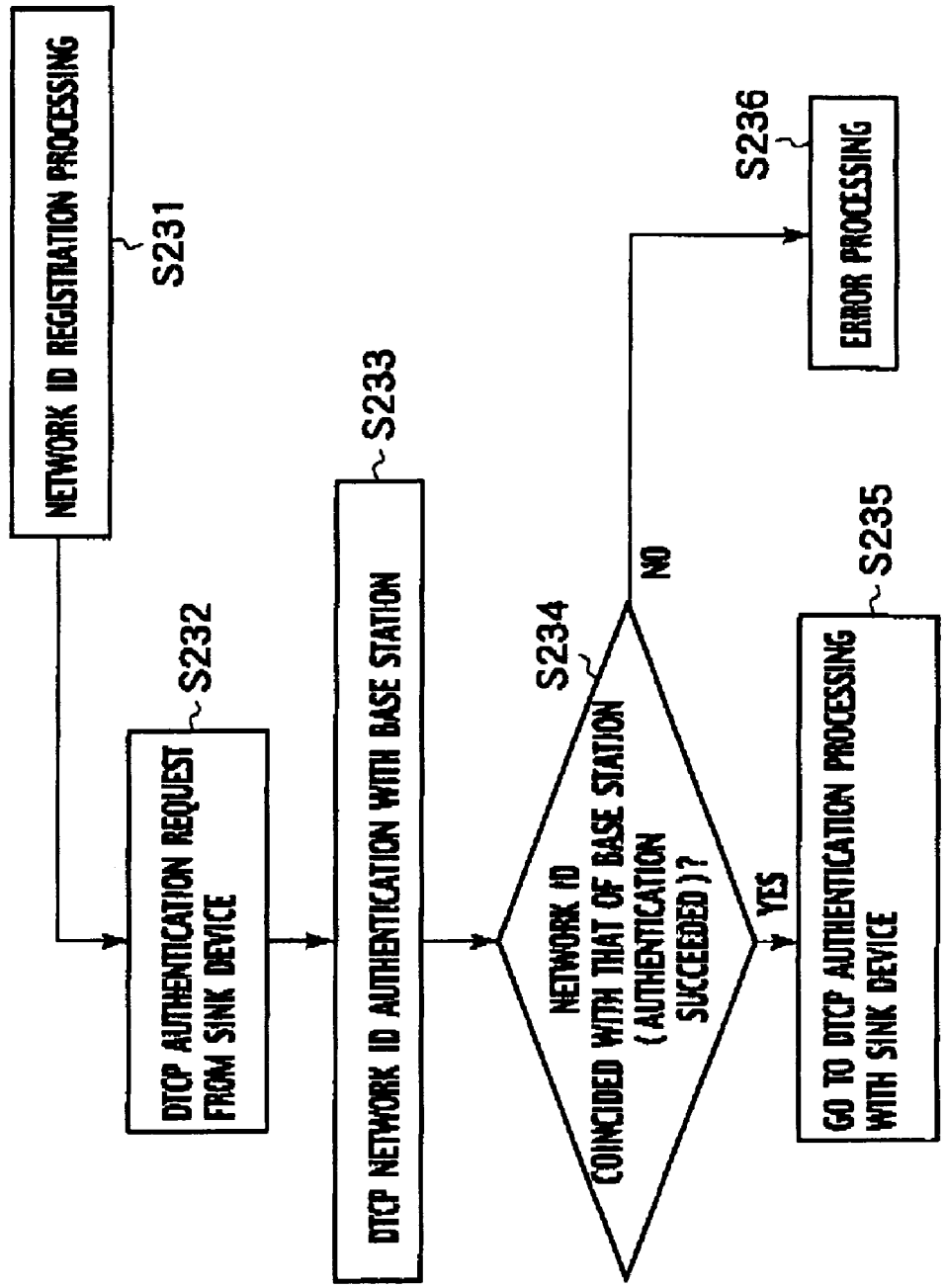
FIG. 23 is a flow chart showing a processing procedure of a source device according to the second embodiment of the present invention.

FIG. 23 shows a processing procedure of the source device 101. As shown in FIG. 23, the same DTCP network ID as that of the wireless base station 102 is also registered at the source device 101 in advance (step S231). When the DTCP device authentication and key exchange request is received from the sink device 103 (step S232), the source device 101 carries out the mutual authentication processing to check whether the DTCP network ID values coincide or not with the wireless base station 102 (step S233). This authentication can be carried out by the similar procedure as the authentication used between the sink device 103 and the wireless base station 102 described above.

Next, whether this authentication succeeded or not is judged (step S234), and if it succeeded, the DTCP device authentication and key exchange processing is carried out with the sink device 103 (step S235), whereas if it failed, the error processing is carried out (step S236).

Note that it is also possible to carry out the data concealment and verification processing using the device authentication and key exchange and the encryption at the wireless link layer as in the IEEE 802.11i, prior to this DTCP network ID authentication.

Figure 24:
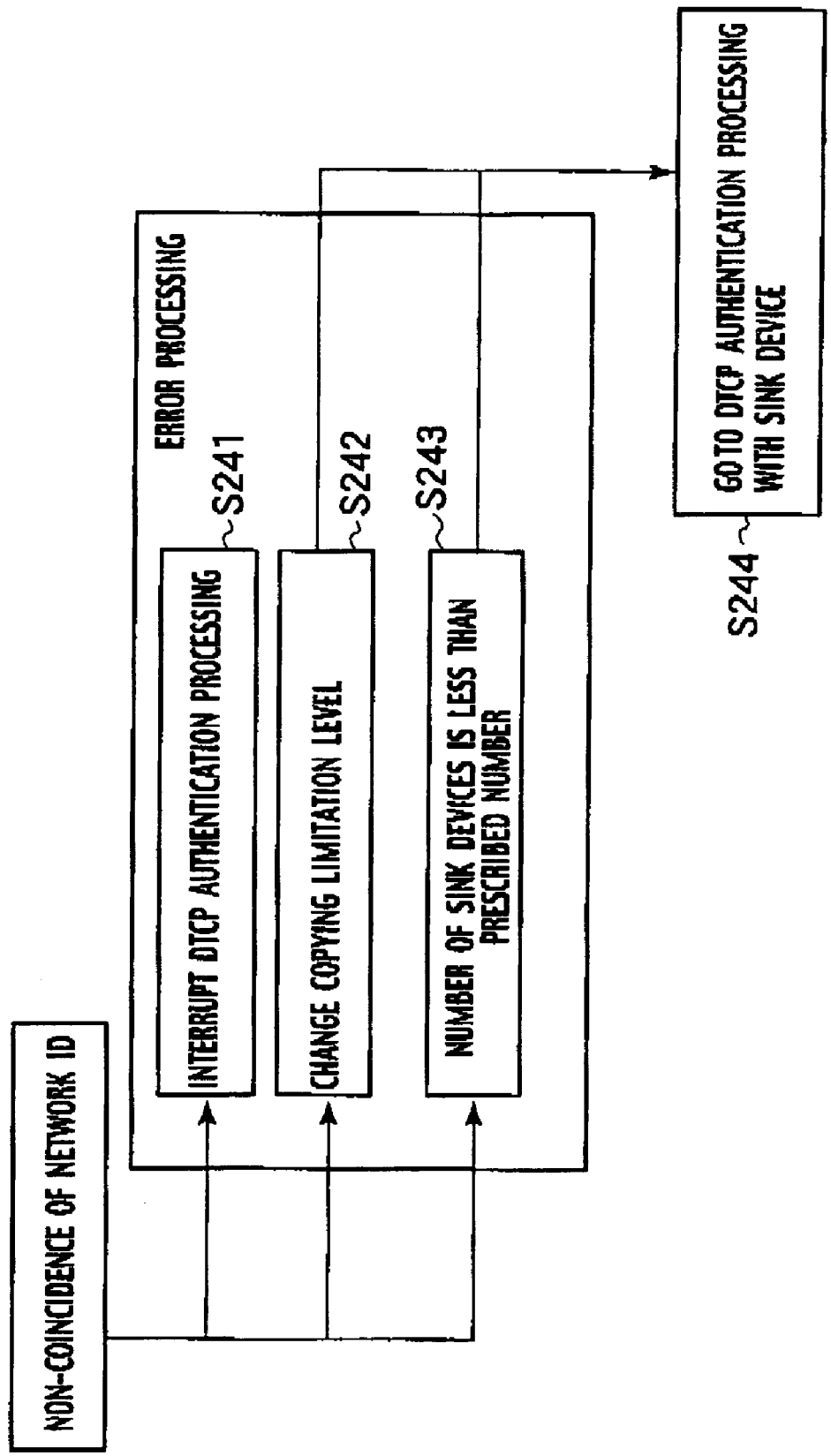
FIG. 24 is a flow chart showing a procedure of an error processing at a step S36 in the processing procedure of FIG. 23.

FIG. 24 shows a procedure of the error processing at the step S236 of FIG. 23. The error processing can use: (1) a method for discarding the DTCP authentication request received from the sink device 103 and finishing the DTCP authentication processing (step S241), (2) a method for changing the copying limitation level (step S242). (3) a method for limiting a number of sink devices to which the contents are to be distributed (step S243), or (4) a method in which the above described (2) and (3) are combined, for example.

In the case of (1), it is possible to use a method for transmitting an error message for rejecting the DTCP authentication request to the sink device 103, or a method for not responding at all. In the case of (2), even when the sink device 103 requests the contents at a level of Copy One Generation to the source device 101, if the DTCP network ID authentication between the source device 101 and the wireless base station 102 fails, the contents are transmitted at a tighter copying limitation level of Copy Never or No More Copies, for example. As for the case of (3), the DTCP has a function for temporarily limiting the number of the sink devices 103 to which the contents are to be distributed according to a counter for recording the number of the sink devices 103, even if the DTCP device authentication and the key exchange processing succeeded, for example. Even when a plurality of sink devices 103 request the contents at a level of Copy One Generation, the contents are distributed at a level of Copy One generation only with respect to a prescribed number of them, and either the authentication is rejected or the contents are transmitted at a level of Copy Never or No More Copies for the other devices in excess of the prescribed number, so as to limit the number of the sink devices 103 to the prescribed number.

In this way, even if the wireless communication system is constructed by using the wireless base station 102 which has no DTCP network ID, it is possible for the source d vice 101 to transmit the contents to the sink devices 103 after applying some limitation. Namely, it becomes possible to prevent the unlimited copying of the contents by the source device 101 with respect to the sink devices 103.

Figure 25:
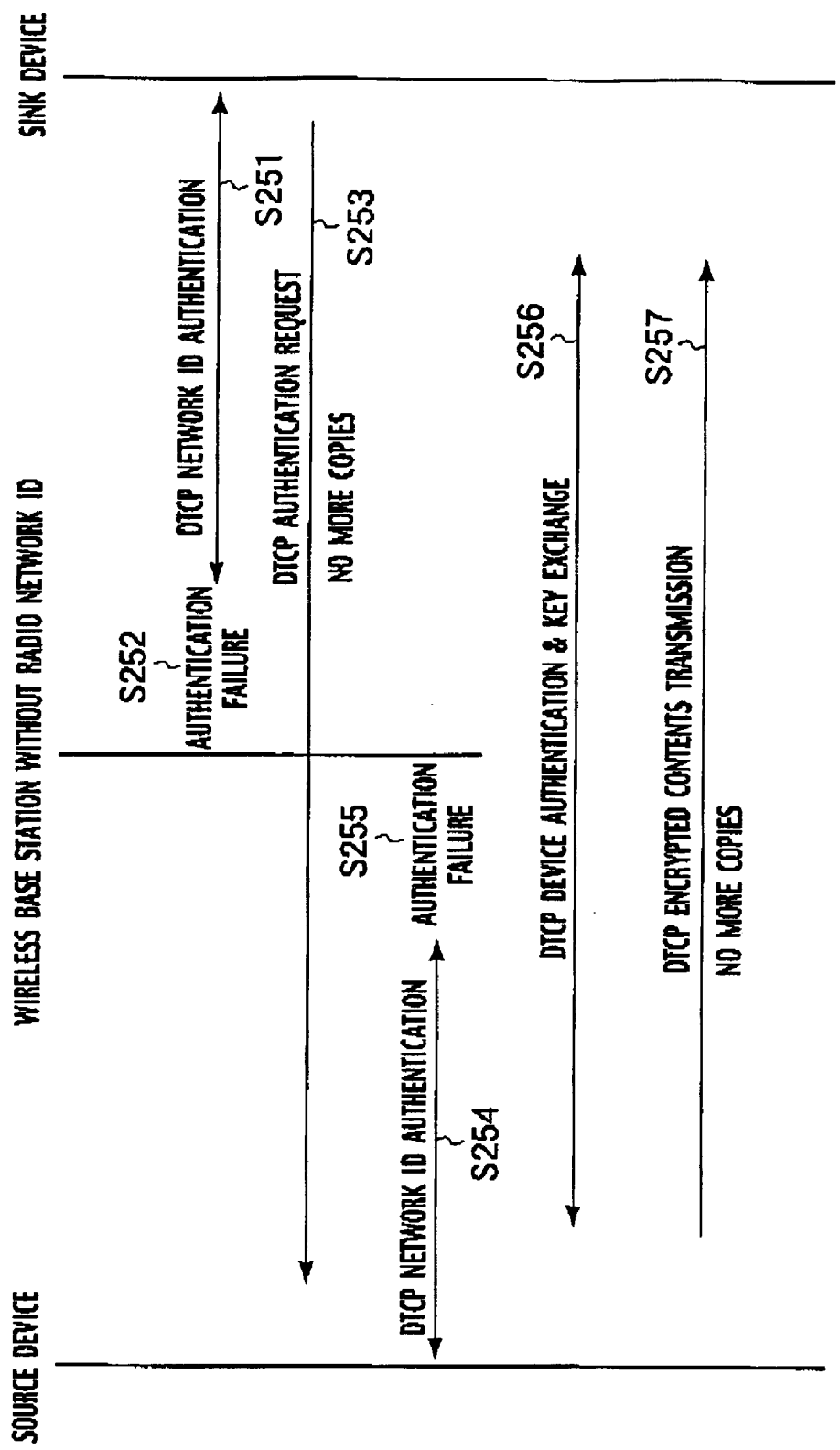
FIG. 25 is a sequence chart showing a processing procedure of a wireless communication system when a wireless base station does not have a DTCP network ID according to the second embodiment of the present invention.

FIG. 25 shows a processing procedure of the wireless communication system of this embodiment in the case where the wireless base station 102 does not have any DTCP network ID, which is a procedure for receiving the contents with CCI of No More Copies at the sink device 103 from the source device 101 by using the wireless base station 102 which does not have any DTCP network ID.

Here, it is assumed that the source device 101 can transmit the contents only in the case where the contents are requested with CCI of No More Copies from the sink device 103, even if the DTCP network ID does not coincide with the wireless base station 102.

First, the sink device 103 attempts the DTCP network ID authentication with respect to the wireless base station 102 (step S251). This authentication processing fails as the wireless base station 102 does not have any DTCP network ID (step S252).

Next, the sink device 103 transmits the DTCP device authentication and key exchange request with CCI of No More Copies to the source device 101 (step S253). When this DTCP device authentication and key exchange request from the sink device 103 is received, the source device 101 attempts the DTCP network ID authentication with respect to the wireless base station 102 (step S254). This DTCP network ID authentication may be omitted. This DTCP network ID authentication fails (step S255), but the source device 101 carries out the DTCP device authentication and key exchange processing with respect to the sink device 103 because CCI is No More Copies (step S256). If this authentication succeeds, the source device 1 transmits the contents to sink device 103 after encrypting the contents (step S257).

In the above, an exemplary case where the wireless base station 102 is a wireless base station that does not have any DTCP network ID has been described, but it is also possible to limit or prohibit the contents transmission from the source device 101 to the sink device 103 by carrying out the similar processing even in the case where the DTCP network IDs of the wireless base station 102 and the sink device 103 are different.

Also, even if the sink device 103 and the source device 101 successfully finish the DTCP network ID authentication with the wireless base station 102 or with each other and the DTCP device authentication and key exchange processing is normally carried out, it is possible to carry out the DTCP network ID authentication during the DTCP device authentication and key exchange processing or the DTCP encrypted contents transmission processing. This is quite effective against the roaming attack in which the wireless base station 102 in communication is switched to another base station.

Figure 26:
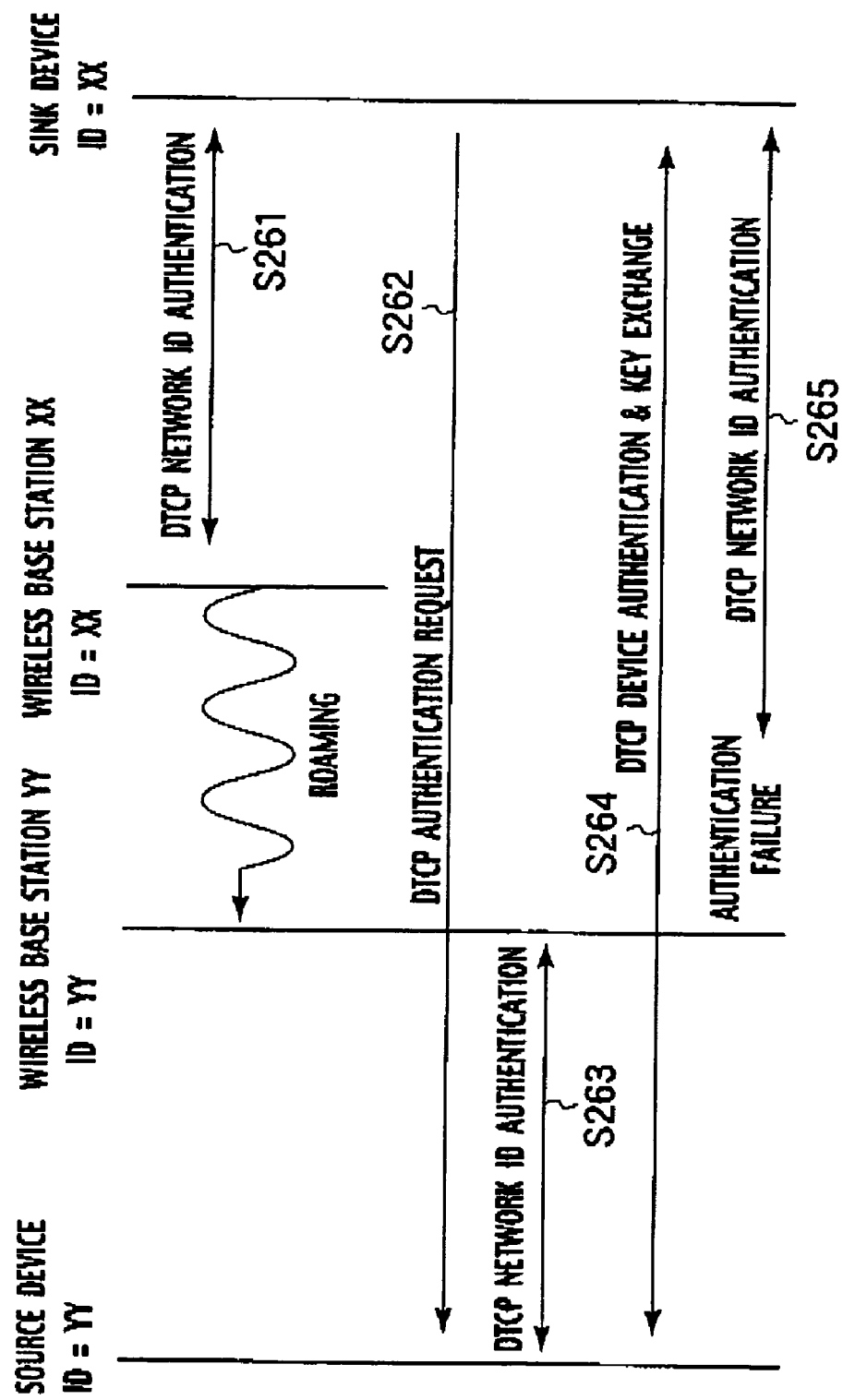
FIG. 26 is a sequence chart showing a processing procedure of a wireless communication system with a measure against roaming according to the second embodiment of the present invention.

FIG. 26 shows a processing procedure of the wireless communication system with a measure against the roaming. As shown in FIG. 26, it is assumed that the sink device 103 and the wireless base station XX share the same DTCP network ID=XX, and the source device 101 and the wireless base station YY shares the same DTCP network ID=YY.

Here, the sink device 103 carries out the DTCP network ID authentication with respect to the wireless base station XX first (step S261). This authentication succeeds as the wireless base station XX has the same DTCP network ID=XX. At this point, suppose that the sink device 103 changes the base station from the wireless base station XX to the wireless base station YY. This change is made at the wireless datalink layer so that the layers above the IEEE 802.11 processing unit in the source device 101 or the sink device 103 cannot know this change.

Next, the sink device 103 transmits the DTCP authentication request to the source device 101 (step S262), and the source device 101 carries out the DTCP network ID authentication with the wireless base station YY (step S263). This authentication succeeds as the wireless base station YY has the same DTCP network ID=YY. Then, the DTCP device authentication and key exchange processing is carried out between the sink device 103 and the source device 101 (step S264).

Here, what is important is that the wireless base station with which the contents transmission and reception are to be carried out is different from the wireless base station with which the DTCP network ID authentication was carried out. For this reason, the DTCP network ID authentication is also carried out at a time of transmitting and receiving the contents (step S265). In this way, it is possible to check that the currently communicating wireless base station is a device which has the same DTCP network ID.

In this embodiment, the source device 101 and the sink device 103 are realizing through the wireless base station 102 a situation in which "the contents transmission and reception processing operates normally between devices existing in the same network" and "the contents transmission and reception processing does not operate normally or a limitation is imposed on the contents transmission and reception between devices existing in different network".

For example, by assigning the same ID to the source device 101, the sink device 103 and the wireless base station 102 which are own by the same person Mr. A, it is possible to transmit the contents from the own source device 101 to the sink device 103 through the wireless base station 102. The device manufacturer or seller assigns a unique ID to the wireless base station and the general users cannot change this ID, so that the ID of the wireless base station 105 owned by a different person Mr. B is different from the ID of the wireless base station 102 owned by Mr. A. Consequently, it is possible to realize an environment in which the sink device or the source device 104 owned by Mr. B is set to have the ID of the wireless base station 105 owned by Mr. B, and the contents will not be transmitted from the source device of Mr. B to the sink device 103 of Mr. A.

In other words, in general, in the case where the interface is wireless, as long as the sink device 103, the wireless base station 102 and the source device 101 are located within a range in which radio waves can be physically received, the sink device 103 can transmit a contents request command to the source device 101 to which a different ID is assigned. Consequently, Mr. N who can learn the ID of the wireless base station of Mr. M who owns the source device 101 and the wireless base station 102 would be able to receive the contents of Mr. M stored in the source device, by setting the ID of the own sink device as the ID of the wireless base station of Mr. M, and it would become possible to construct an environment in which Mr. M distributes the contents freely regardless of the presence or absence of the malicious intention.

For the same reason, Mr. P and Mr. Q who can learn the ID of the wireless base station owned by Mr. O would be able to transmit or receive the contents by setting the ID of their own source device or sink device to be the ID of the wireless base station of Mr. O, regardless of the intention of Mr. O and without making Mr. O aware of the intentions of Mr. P and Mr. Q.

For this reason, in this embodiment, the number of times for changing the ID of the sink device 103 and the source device 101 is limited, so as to limit the changing of the network to which the sink device 103 and the source device 101 belong.

Now, In FIG. 16, in the case where the DTCP network ID of the local area wireless network changes as in the case where the sink device 103 moves from the local area wireless network A to the local area wireless network B, it suffices to change the DTCP network ID of the sink device 103 and the source device 101 from the ID corresponding to the wireless base station 102 to the in corresponding to the wireless base station 105.

Also, regarding the DTCP network ID recorded in the DTCP network ID recording unit 113 of the wireless base station 102, it is possible to enable the purchase of the wireless base station with the identical DTCP network ID, by reporting the DTCP network ID of the previous wireless base station used before the purchase of the new wireless base station, to the device manufacturer or seller.

The above description is directed to the case where the source device 101 and the sink device 103 transmits and receives contents through a single wireless base station 2 which has the same DTCP network ID. However, there can be cases where the same person Mr. A owns two or more wireless base stations. In this case, there are various methods for connecting the DTCP network formed by the plurality of wireless base stations, the source device 101 and the sink device 103. For example, it is possible to use: (1) a method for purchasing the wireless base stations by specifying the DTCP network ID, or (2) a method for providing a plurality of registers for recording a plurality of DTCP network IDs.

Also, it is useful for the copyright owner to provide a revocation mechanism in which the DTCP network ID of the source device 101 or the wireless base station 102 can be invalidated when it is revealed that a malicious owner of the source device 101 discloses the DTCP network ID of the source device 101 and the wireless base station 102 to the public so as to construct an environment in which the contents can be distributed without a permission of the copyright owner.

Figure 27:
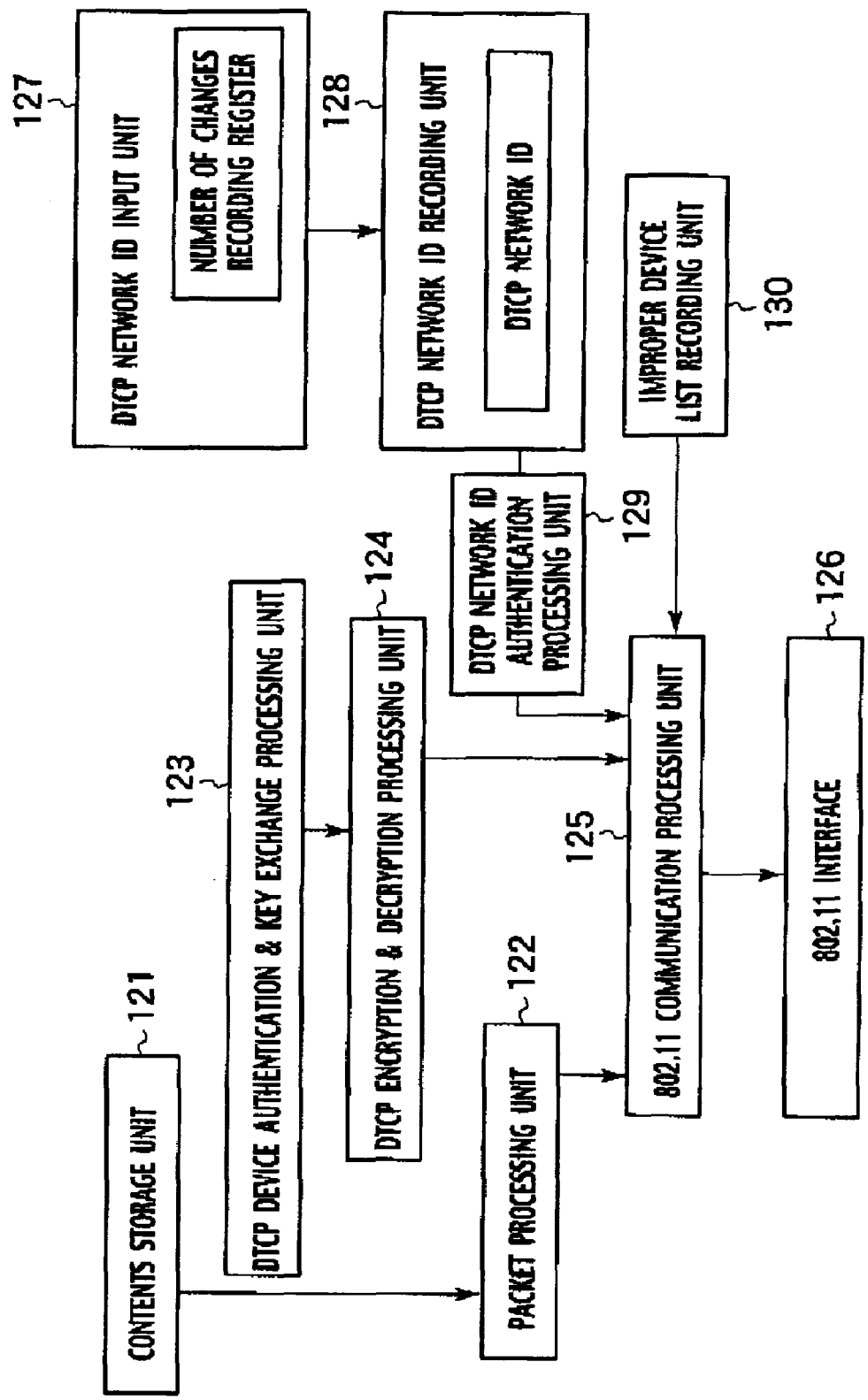
FIG. 27 is a block diagram showing an exemplary internal configuration of a source device with a revocation function according to the second embodiment of the present invention.

FIG. 27 shows an internal configuration of the source device 101 with a revocation function, in the configuration of FIG. 27, an improper device list recording unit 130 for storing a list of invalid DTCP network IDs is added to the configuration of FIG. 18. The general users cannot rewrite the content of the improper device list recording unit 130.

Figure 28:
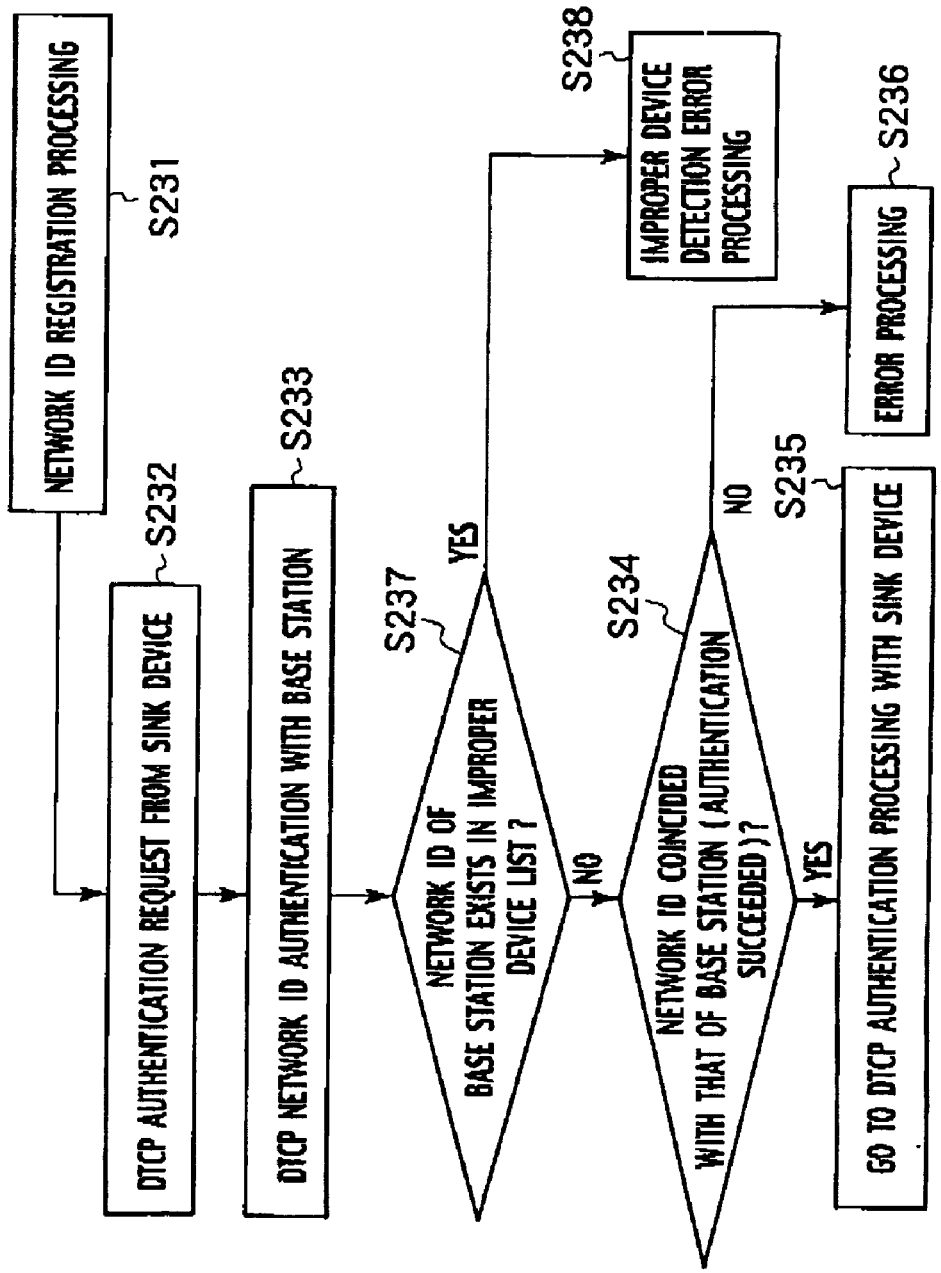
FIG. 28 is a flow chart showing a processing procedure of a source device with a revocation function according to the second embodiment of the present invention.

FIG. 28 shows a processing procedure of the source device of FIG. 27, which differs from the processing procedure of FIG. 23 in that, before carrying out the DTCP network ID authentication processing with the wireless base station 102, whether the network ID of the wireless base station 102 is recorded in the improper device list recording unit 130 or not is judged (step S237), and if it is recorded, the wireless base station 102 is judged as an improper device and the error processing is carried out (step S238).

Note that the improper device list recording unit may be provided inside the wireless base station. In this case, the wireless base station checks the improper device list recording unit before carrying out the network ID authentication, and refuses to carry out the network ID authentication with a transmitting device that is recorded in the improper device list recording unit.

As described, according to the first embodiment, the number of times for changing the DTCP network ID is limited, so that it is possible to prevent the malicious use of the contents for which the copyright protection is necessary. Also, when the authentication fails, the contents transmission is permitted after imposing some limitation, rather than completely prohibiting the contents transmission, so that the convenience of the user can be improved while realizing the copyright protection.

In addition, the DTCP network ID authentication is repeated at a prescribed time interval as a measure against the roaming, so that it is possible to prevent the malicious use of the contents using the roaming.

Also, by storing a list of the invalid DTCP network IDs, it is possible to discover the improper device quickly.

Referring now to FIG. 29 to FIG. 33, the third embodiment of the present invention will be described in detail.

In the second embodiment described above, the source device 101 transmits the contents to the sink device 103 through the wireless base station 102. In contrast, in this third embodiment, the source device 101 transmits the contents directly to the sink device 103, without using the wireless base station.

In the IEEE 802.11, a communication mode called ad hoc mode in which wireless devices communicate without using the wireless base station is defined. This embodiment is directed to the case of carrying out the communications by utilizing the ad hoc mode, and in the following, the difference from the second embodiment will be mainly described.

Figure 29:
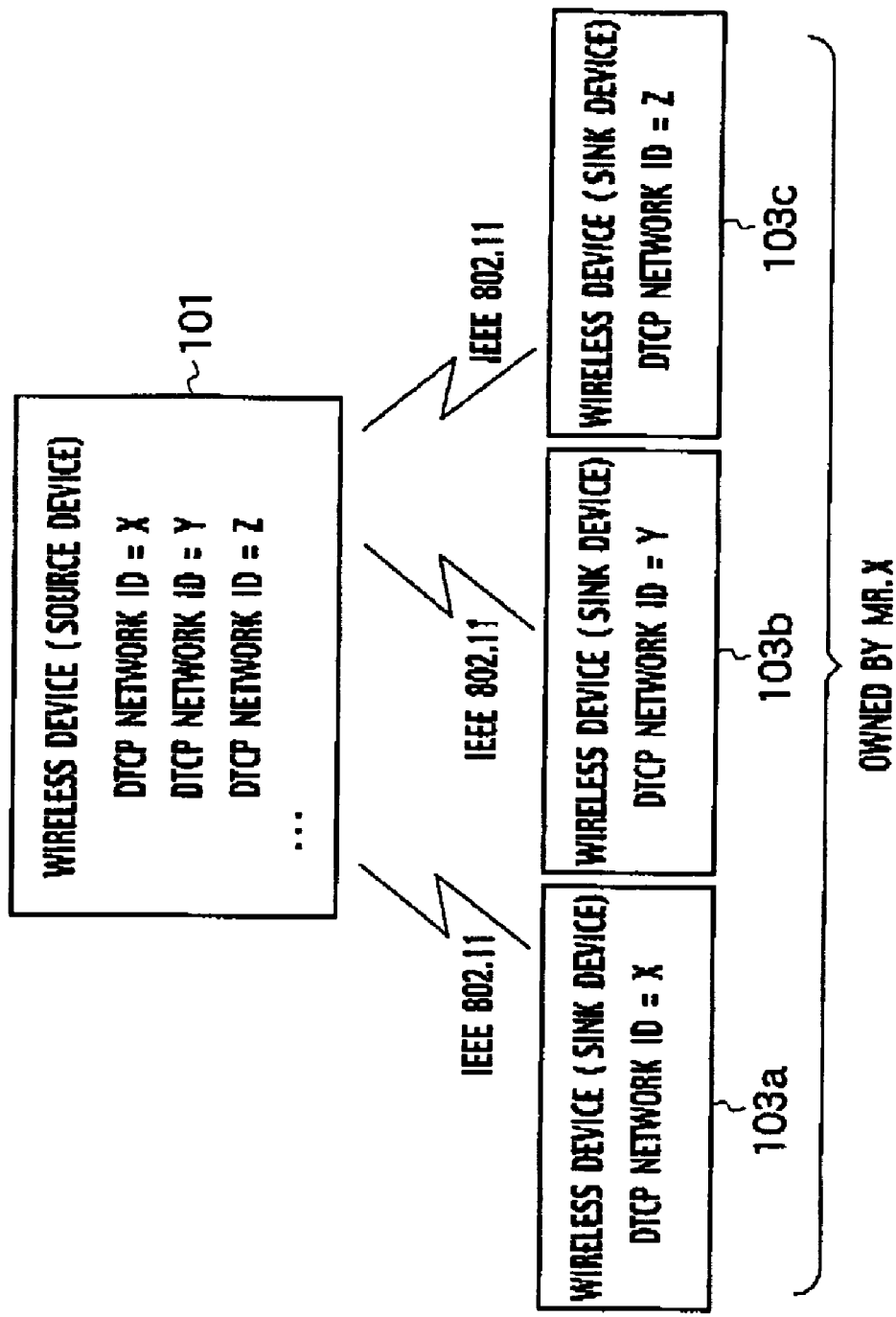
FIG. 29 is a schematic diagram showing an exemplary overall configuration of a wireless communication system according to the third embodiment of the present invention.

FIG. 29 shows a schematic configuration of the wireless communication system according to the third embodiment of the present invention. As shown in FIG. 29, the source device 101 and the sink devices 303a, 103b and 103c are located within a range in which they can carry out communications with each other. It is assumed that the sink devices 103a, 103b and 103c are owned by Mr. X. The source device 101 records the DTCP network IDs of the sink devices 103a, 103b and 103c in the DTCP network ID recording unit, in order to carry out the DTCP network ID authentication with the sink devices 103a, 103b and 103c.

In the second embodiment, the DTCP network ID that cannot be freely changed by the owner is set in the wireless base station 102 in advance, and the contents transmission and reception through the wireless base station 102 are carried out by setting a value of the DTCP network ID of the source device 101 and the sink device 103 to be identical to that of the wireless base station 102. In contrast, in the third embodiment, each one of the wireless base station does not exist, so that the source device 101 and the sink devices 103a, 103b and 103c sets the DTCP network ID to arbitrary value.

However, the number of the DTCP network IDs that can be recorded by each one of the source device 101 and the sink devices 103a, 103b and 103c is limited to a prescribed number according to the DTCP network 1D recording unit. Also, the source device 101 and each one of the sink devices 103a, 103b and 103c must record the same DTCP network ID, so that the source device 101 cannot transmit the contents to the sink devices in excess of the prescribed number, as long as the DTCP network ID is not changed. For the same reason, the sink devices cannot receive the contents from the source devices in excess of the prescribed number.

As a method for resolving this problem, there is a method for setting the DTCP network IDs of all the devices owned by Mr. X to be identical.

Figure 30:
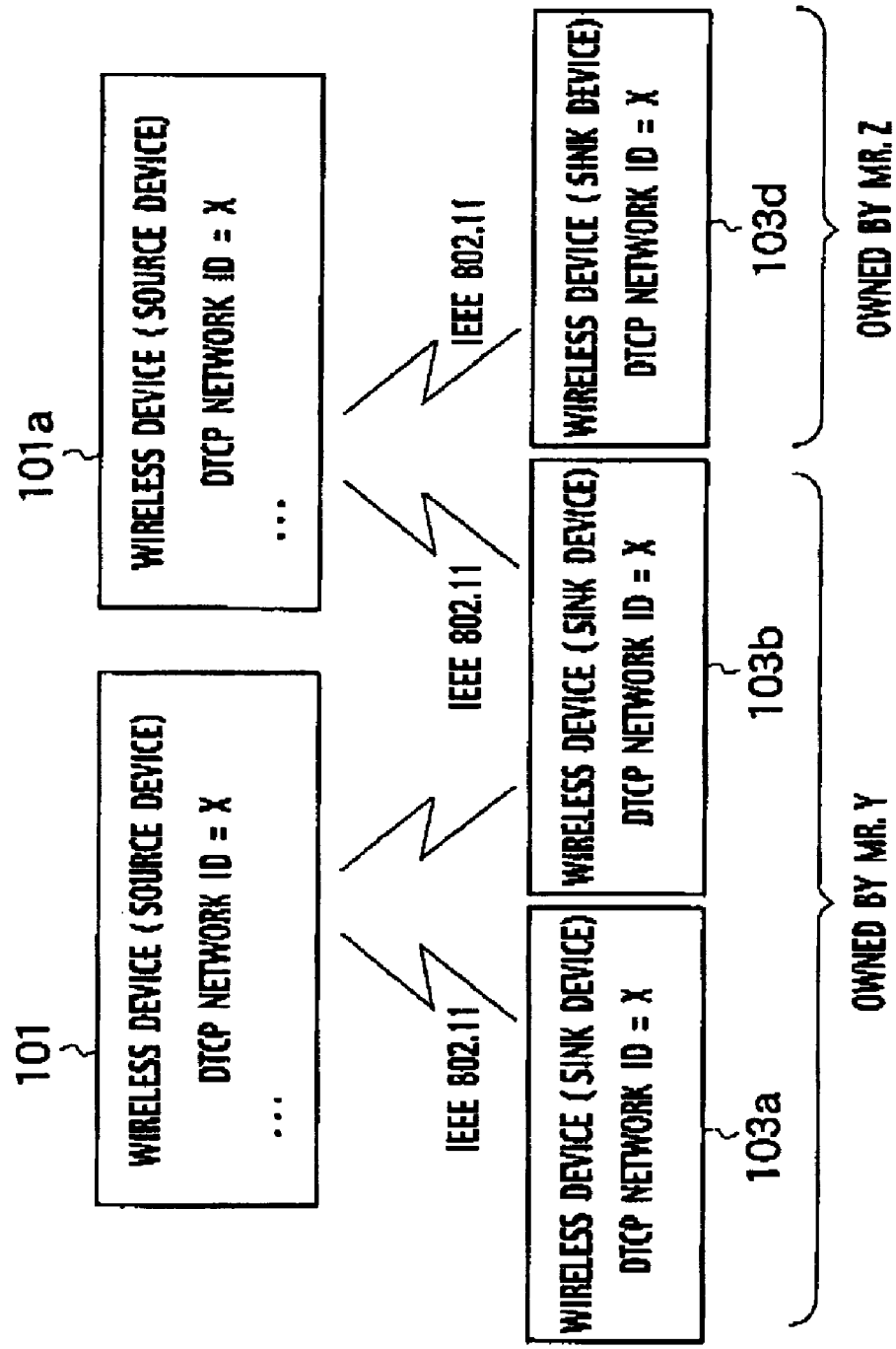
FIG. 30 is a schematic diagram showing an exemplary case of setting DTCP network IDs of all, devices to be identical in the wireless communication system of FIG. 29.

However, as shown in FIG. 30, if the DTCP network IDs of all the devices are set to be identical, the DTCP network ID authentication would succeed among all the devices regardless of the owner of the wireless devices, so that it is impossible to prevent the contents distribution by the malicious owner of the sink device.

For this reason, in the case of carrying out the communications in the ad hoc mode, the same error processing as used when the DTCP network ID authentication fails in the infrastructure mode is carried out, so as to carry out the contents transmission after a limitation is imposed.

Namely, there are various possible methods that can be used by the error processing including: (1) a method for discarding the DTCP authentication request received from the sink device and finishing the DTCP authentication processing, (2) a method for changing the copying limitation level, (3) a method for limiting a number of sink devices to which the contents are to be distributed, or (4) a method in which the above described (2) and (3) are combined, for example.

Figure 31:
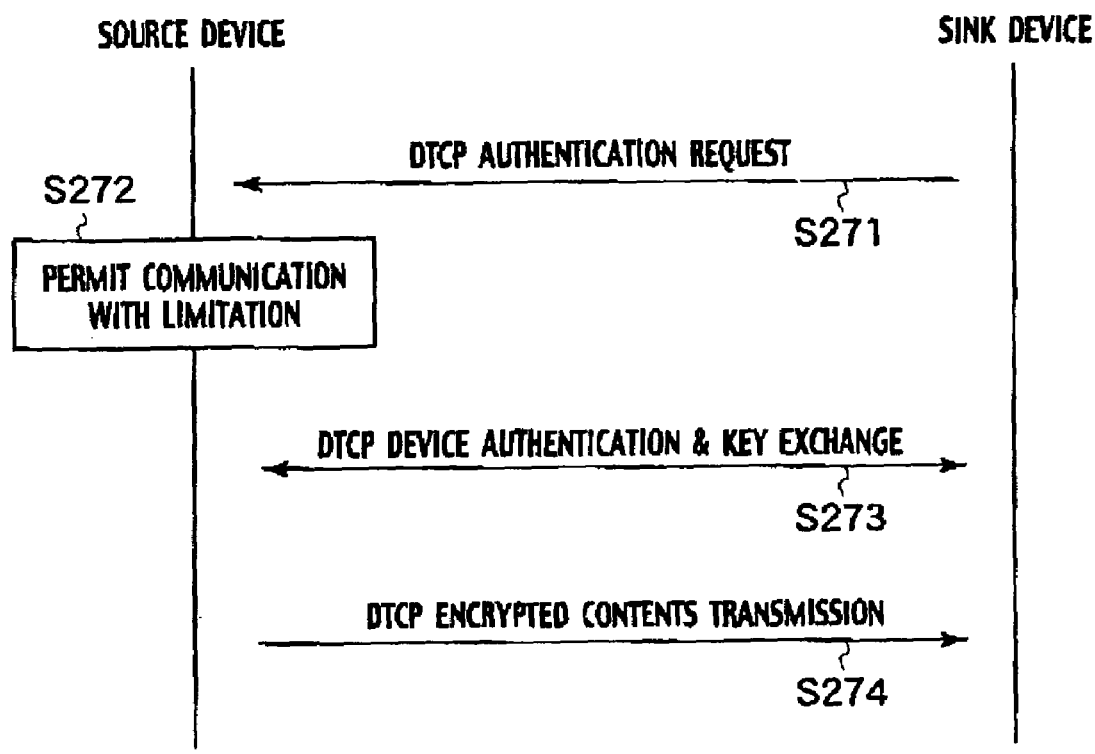
FIG. 31 is a sequence chart showing a processing procedure of a wireless communication system in an ad hoc mode according to the second embodiment of the present invention.

FIG. 31 shows a processing procedure of the wireless communication system in the ad hoc mode.

First, each one of the sink devices 103a, 103b and 103c makes the DTCP authentication request with respect to the source device 101 (step S271). Upon receiving this request, the source device 101 permits communications with a limitation (step S272).

Then, the DTCP device authentication and key exchange processing is carried out between the source device 101 and each one of the sink devices 103a, 103b and 103c (step S273). Then, the contents encrypted by using the exchanged key are transmitted from the source device 101 to the sink devices 103a, 103b and 103c (step S274).

FIG. 32 shows a processing procedure of each one the sink devices 103a, 103b and 103c.

Each one of the sink devices 103a, 103b and 103c checks a mode of communications with the source device 101 (step S281).

In the ease where the communication mode is the ad hoc mode, the DTCP network ID authentication is not carried out. Of course, it is also possible to carry out the DTCP network ID authentication processing, but the DTCP authentication request is transmitted to the source device 101 regardless of whether the authentication succeeds or fails (step S282).

On the other hand, in the case where the communication mode is the infrastructure mode, the DTCP network ID authentication processing is carried out with the wireless base station (step S283).

Next, whether the DTCP network IDs coincide or not is judged (step S284), and If they do not coincide, the processing of the step S282 is carried out, whereas if they coincide, the DTCP device authentication and key exchange processing is carried out with the source device 101 (step S285).

FIG. 33 shows a processing procedure of the source device 101.

When the DTCP authentication request is received from the sink device 103a, 103b or 103c (step S291), the source device 101 checks the communication mode next (step S292).

In the case where the communication mode is the ad hoc mode, If the request of the sink device 103a, 103b or 103c satisfies the limitation of the source device 101, the DTCP authentication request is accepted (step S293). For example, in the case where the source device 101 limits the number of sink devices to be connected to one, the request of the sink device which is connected second or subsequent will be rejected.

On the other hand, in the case where the source device 101 limits the number of sink devices that can be permitted at a level of No More Copies to five, if the sink device which is connected second is requesting the DTCP authentication at a level of No More Copies, this request will be accepted.

On the other hand, in the case where the communication mode is the infrastructure mode, the DTCP network ID authentication processing is carried out with the wireless base station (step S294), and whether the DTCP network IDs are identical or not is judged (step S295). If they are not identical, the processing of the step S293 is carried out, whereas if they are identical, the DTCP device authentication and key exchange processing is carried out (step S296).

In the third embodiment, the device configuration can be simplified compared with the second embodiment, because the DTCP network ID authentication processing is not absolutely necessary if the source device 101 and the sink devices 103a, 103b and 103c are supporting only the communication mode of the ad hoc mode.

For example, in the case where Mr. X owns a portable type sink device (a display device, for example), and Mr. X is not necessarily requesting the storing of the contents from the source device (a DVD player device, for example) of Mr. Y, and wishing only to view it once for all, it is possible to construct the wireless communication system without setting by using the ad hoc mode, and transmit the contents from the source device of Mr. Y to the sink device of Mr. X.

In this way, according to the third embodiment, the contents are transmitted without permitting the copying in the case of carrying out the communications in the ad hoc mode, so that it is possible to surely prevent the Illegal copying of the contents even if each sink device sets the DTCP network ID arbitrarily.

Note that, in the embodiments described above, the exemplary case of using the IEEE 802.11 as the wireless LAN has been described, but the present invention is equally applicable to various types of the wireless LAN such as the Bluetooth.

As described according to the second and third embodiments, the number of receiving devices that carry out the device authentication and key exchange is switched according to the communication mode so that it is possible to prevent the malicious use of the contents for which the copyright protection is necessary.

Also, when the authentication fails, the contents transmission is permitted after imposing some limitation, rather than completely prohibiting the contents transmission, so that the convenience of the user can be improved while realizing the copyright protection.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the wireless device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks. ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A transmitting device for transmitting contents for which a copyright protection is necessary, to one or more receiving devices through a network, the transmitting device comprising:

a contents supply unit configured to store or generate the contents;

a communication processing unit configured to select a communication mode in a case of carrying out communications with receiving devices;

a device authentication and key exchange processing unit configured to determine a receiving device number indicating a number of receiving devices with which communications can be carried out, according to the communication mode selected by the communication processing unit, and to carry out device authentication and key exchange with receiving devices in number which is less than or equal to the receiving device number;

an encryption processing unit configured to encrypt the contents by using a key exchanged by the device authentication and key exchange processing unit;

a network interface unit configured to transmit the contents encrypted by the encryption processing unit, to the receiving devices in number which is less than or equal to the receiving device number; and a revocation information registration unit configured to register an identification information of each receiving device to which a transmission of the contents should be prohibited;

wherein the device authentication and key exchange processing unit does not carry out the device authentication and key exchange with any receiving device whose identification information is registered in the revocation information registration unit.

2. A transmitting device for transmitting contents for which a copyright protection is necessary, to one or more receiving devices through a wireless base station via a network, the transmitting device comprising:

a contents supply unit configured to store or generate the contents;

an ID recording unit configured to record in advance a network ID of the wireless base station which is to be used in an authentication processing with the wireless base station;

a network ID authentication processing unit configured to carry out authentication of the network ID with the wireless base station by using the network ID recorded in the ID recording unit;

a device authentication and key exchange processing unit configured to switch a receiving device number indicating a number of receiving devices with which communications can be carried out, according to an authentication result obtained by the network ID authentication processing unit, and to carry out device authentication and key exchange with receiving devices in number which is less than or equal to the receiving device number;

an encryption processing unit configured to encrypt the contents by using a key exchanged by the device authentication and key exchange processing unit; and a network interface unit configured to transmit the contents encrypted by the encryption processing unit, to the receiving devices in number which is less than or equal to the receiving device number;

wherein the device authentication and key exchange processing unit switches the receiving device number such that the receiving device number used in a case where the authentication by the network ID authentication processing unit succeeds is larger than the receiving device number used in a case where the authentication fails.

3. A transmitting device for transmitting contents for which a copyright protection is necessary, to one or more receiving devices through a wireless base station via a network, the transmitting device comprising:

a contents supply unit configured to store or generate the contents;

an ID recording unit configured to record in advance a network ID of the wireless base station which is to be used in an authentication processing with the wireless base station;

a network ID authentication processing unit configured to carry out authentication of the network ID with the wireless base station by using the network ID recorded in the ID recording unit;

a device authentication and key exchange processing unit configured to switch a receiving device number indicating a number of receiving devices with which communications can be carried out, according to an authentication result obtained by the network ID authentication processing unit, and to carry out device authentication and key exchange with receiving devices in number which is less than or equal to the receiving device number;

an encryption processing unit configured to encrypt the contents by using a key exchanged by the device authentication and key exchange processing unit;

a network interface unit configured to transmit the contents encrypted by the encryption processing unit, to the receiving devices in number which is less than or equal to the receiving device number; and a base station ID registration unit configured to register at least one network ID of the wireless base station, in such a state that a number of times for changing once registered network ID is limited to be less than or equal to a prescribed number of times;

wherein the network ID authentication processing unit carries out the authentication according to the at least one network ID registered in the base station ID registration unit.

4. A transmitting device for transmitting contents for which a copyright protection is necessary, to one or more receiving devices through a wireless base station via a network, the transmitting device comprising:

a contents supply unit configured to store or generate the contents;

an ID recording unit configured to record in advance a network ID of the wireless base station which is to be used in an authentication processing with the wireless base station;

a network ID authentication processing unit configured to carry out authentication of the network ID with the wireless base station by using the network ID recorded in the ID recording unit;

a device authentication and key exchange processing unit configured to switch a receiving device number indicating a number of receiving devices with which communications can be carried out, according to an authentication result obtained by the network ID authentication processing unit, and to carry out device authentication and key exchange with receiving devices in number which is less than or equal to the receiving device number;

an encryption processing unit configured to encrypt the contents by using a key exchanged by the device authentication and key exchange processing unit;

a network interface unit configured to transmit the contents encrypted by the encryption processing unit, to the receiving devices in number which is less than or equal to the receiving device number; and a transmission prohibition unit configured to prohibit a transmission of the contents when authentication by at least one of the device authentication and key exchange processing unit and the network ID authentication processing unit fails;

wherein the network ID authentication processing unit repeats the authentication of the network ID with the wireless base station at a prescribed time interval, and the transmission prohibition unit interrupts the transmission of the contents whenever the authentication of the network ID by the network ID authentication processing unit fails.

5. A transmitting device for transmitting contents for which a copyright protection is necessary, to one or more receiving devices through a wireless base station via a network, the transmitting device comprising:

a contents supply unit configured to store or generate the contents;

an ID recording unit configured to record in advance a network ID of the wireless base station which is to be used in an authentication processing with the wireless base station;

a network ID authentication processing unit configured to carry out authentication of the network ID with the wireless base station by using the network ID recorded in the ID recording unit;

a device authentication and key exchange processing unit configured to switch a receiving device number indicating a number of receiving devices with which communications can be carried out, according to an authentication result obtained by the network ID authentication processing unit, and to carry out device authentication and key exchange with receiving devices in number which is less than or equal to the receiving device number;

an encryption processing unit configured to encrypt the contents by using a key exchanged by the device authentication and key exchange processing unit;

a network interface unit configured to transmit the contents encrypted by the encryption processing unit, to the receiving devices in number which is less than or equal to the receiving device number; and a revocation information registration unit configured to register an identification information of each wireless base station to which a transmission of the contents should be prohibited;

wherein the network ID authentication processing unit does not carry out the authentication with any wireless base station whose identification information is registered in the revocation information registration unit.

* * * * *